Feb. 3, 1959 F. A. MORRIS 2,872,521

LINKAGE ALLOTTING SYSTEM FOR AUTOMATIC TELEPHONE SYSTEM

Filed Sept. 6, 1952 15 Sheets-Sheet 1

INVENTOR.
Frank A. Morris
BY
T. L. Bowes
Att'y

LINKAGE ALLOTTING SYSTEM FOR AUTOMATIC TELEPHONE SYSTEM

Filed Sept. 6, 1952 15 Sheets-Sheet 2

INVENTOR.
Frank A. Morris
BY
T. L. Bowes
Att'y

LINKAGE ALLOTTING SYSTEM FOR AUTOMATIC TELEPHONE SYSTEM

Filed Sept. 6, 1952 15 Sheets-Sheet 3

INVENTOR.
Frank A. Morris
BY
T. L. Bowes
Att'y

Feb. 3, 1959 F. A. MORRIS 2,872,521

LINKAGE ALLOTTING SYSTEM FOR AUTOMATIC TELEPHONE SYSTEM

Filed Sept. 6, 1952 15 Sheets-Sheet 4

INVENTOR.
Frank A. Morris
BY
T. L. Bowes
Att'y

LINKAGE ALLOTTING SYSTEM FOR AUTOMATIC TELEPHONE SYSTEM

Filed Sept. 6, 1952 15 Sheets-Sheet 5

INVENTOR.

Frank A. Morris

BY T. L. Bowes

Att'y

LINKAGE ALLOTTING SYSTEM FOR AUTOMATIC TELEPHONE SYSTEM

Filed Sept. 6, 1952 15 Sheets-Sheet 6

INVENTOR.
Frank A. Morris
BY
T. L. Bowes
Att'y

LINKAGE ALLOTTING SYSTEM FOR AUTOMATIC TELEPHONE SYSTEM

Filed Sept. 6, 1952

INVENTOR.
Frank A. Morris
BY
T. L. Bowes
Att'y

LINKAGE ALLOTTING SYSTEM FOR AUTOMATIC TELEPHONE SYSTEM

Filed Sept. 6, 1952 15 Sheets-Sheet 8

INVENTOR.
Frank A. Morris
BY
T. L. Bowes
Att'y

LINKAGE ALLOTTING SYSTEM FOR AUTOMATIC TELEPHONE SYSTEM

Filed Sept. 6, 1952 15 Sheets-Sheet 9

INVENTOR.
Frank A. Morris
BY T. L. Bowes
Att'y

INVENTOR.
Frank A. Morris
BY F. L. Bowes
Att'y

Feb. 3, 1959 F. A. MORRIS 2,872,521

LINKAGE ALLOTTING SYSTEM FOR AUTOMATIC TELEPHONE SYSTEM

Filed Sept. 6, 1952 15 Sheets-Sheet 11

INVENTOR.
Frank A. Morris
BY
T. L. Bowes
Atty

Feb. 3, 1959 F. A. MORRIS 2,872,521

LINKAGE ALLOTTING SYSTEM FOR AUTOMATIC TELEPHONE SYSTEM

Filed Sept. 6, 1952 15 Sheets-Sheet 12

INVENTOR.
Frank A. Morris
BY
T. L. Bowes
Att'y

Feb. 3, 1959 F. A. MORRIS 2,872,521

LINKAGE ALLOTTING SYSTEM FOR AUTOMATIC TELEPHONE SYSTEM

Filed Sept. 6, 1952 15 Sheets-Sheet 13

INVENTOR.
Frank A. Morris
BY T. L. Bowes
Att'y

Feb. 3, 1959 F. A. MORRIS 2,872,521

LINKAGE ALLOTTING SYSTEM FOR AUTOMATIC TELEPHONE SYSTEM

Filed Sept. 6, 1952 15 Sheets-Sheet 14

INVENTOR.
Frank A. Morris
BY T. L. Bowes
Att'y

Feb. 3, 1959 F. A. MORRIS 2,872,521

LINKAGE ALLOTTING SYSTEM FOR AUTOMATIC TELEPHONE SYSTEM

Filed Sept. 6, 1952 15 Sheets-Sheet 15

INVENTOR.
Frank A. Morris
BY
J. L. Bowes
Atty 2,872,521

LINKAGE ALLOTTING SYSTEM FOR AUTOMATIC TELEPHONE SYSTEM

Frank A. Morris, Rochester, N. Y., assignor, by mesne assignments, to General Dynamics Corporation, a corporation of Delaware Application September 6, 1952, Serial No. 308,260

9 Claims. (Cl. 179—15)

The present invention relates to improved methods and apparatus for selectively setting up signal transmission connections between the lines of a signaling system, and, more particularly, to improved methods and apparatus for setting up two-way communication connections between the lines of an automatic telephone system. Specifically, the present invention is directed to certain improvements in a fully automatic telephone system of the improved form disclosed and claimed in a copending application of Robert B. Trousdale and Frank A. Morris, Serial No. 134,974, filed on December 24, 1949, which matured as Patent No. 2,773,934 on December 11, 1956, and a copending application of Robert B. Trousdale, Serial No. 257,712 filed on November 23, 1951, both of which applications are assigned to the same assignee as the present invention, the specific improvements of the present invention relating to the assignment or allotment of the line selecting and signal transmission links of the system to the use of calling lines to the system.

Many types of automatic switching apparatus have been proposed and developed for transmitting signals between the lines of telephone, telegraph, and other communication systems. In the main, the apparatus proposed and developed for this purpose utilizes electro-mechanical devices embodying moving mechanical parts, such, for example, as relays, stepping switches, and the like, to perform the line finding, line selecting, line interconnecting and auxiliary functions required in selectively interconnecting any two lines of a large group of lines. While apparatus of this type and embodying switching devices of various forms has been developed to provide thoroughly reliable service, it is inherently subject to several limitations, including that of insufficient operating speed. To overcome these limitations, various proposals, other than the above identified applications, have been made for utilizing electronic facilities, such, for example, as cathode ray tubes, for the purpose of transmitting signals between the lines of a signaling system on a selective basis. However, most if not all of these proposals are limited to arrangements for providing one-way signal transmission between two lines and include no provisions whatever for performing the ancillary control and supervisory functions, such, for example, as returning dial tone to the calling line, line busying, called line selection, called line busy testing, returning busy tone to the calling subscriber, and called station ringing, which are required in interconnecting the lines of an automatic telephone system.

Furthermore, in accordance with any one of these proposals, it is customary to provide a plurality of interconnecting links or units which are operatively associated with calling lines of the system and are directly controllable over the calling line to select a called one of the lines of the system. In the absence of any provision to the contrary, several of these links may race, or compete, for a single calling line and in some instances several links may become operatively associated with the same calling line. It is obvious that such arrangements require a great many more links to handle a given amount of traffic than if each of the links is individually assigned to the use of a calling line of the system. In the copending application Serial No. 134,974, now Patent No. 2,773,934, identified above, there is disclosed a linkage allotting system wherein the links are allotted to the use of calling lines of the system one at a time so as to prevent competition between the links. It is an object of the present invention to provide improved facilities for allotting line selecting and signal transmission links to successive calling lines of the system on the self-allotting basis.

It is a further object of the present invention to provide a new and improved electronic telephone system provided with facilities for allotting the line selecting and signal transmission links to successive calling lines of the system wherein the allotment of two or more of the links to the same calling line is positvely prevented.

It is a still further object of the present invention to provide a new and improved electronic telephone system wherein the line selecting and signal transmission links are arranged in a predetermined order and improved facilities are provided for assigning successive ones of the links to the use of successive calling lines of the system in the order in which the links are arranged.

The invention, both as to its organization and method of operation, together with further objects and advantages thereof, will best be understood by reference to the following specification taken in connection with the accompanying drawings wherein:

Figs. 1, 2, 3 and 4, when arranged in the manner shown in Fig. 8 diagrammatically illustrate an automatic telephone system characterized by the features of the present invention;

Figs. 2A and 2B, when laid end to end in the order named, diagrammatically illustrate the components of one of the finder-connector links embodied in the system shown in Figs. 1–4, inclusive;

Figs. 5, 6, and 7, when arranged in the manner shown in Fig. 9 illustrate the details of the line finder portions of one of the finder-connector links embodied in the system shown in Figs. 1–4, inclusive, and also disclose the details of the link coupling circuits employed in the system shown in Figs. 1–4, inclusive;

Figs. 10, 11, 12, and 13, when laid side by side in the order named, graphically illustrate the time relationships between certain of the pulses developed by and utilized in the various components of the system; and Figs. 14 and 15 are timing diagrams illustrating the operating characteristics of certain components of the system.

In general the electronic telephone system herein disclosed is capable of serving 100 lines, each of which lines may have associated therewith a number of party line substations up to a maximum of ten such party line substations for each line. More specifically, the system is capable of providing two-way communication between any two lines of a 100 line group and on either a private or party line basis, and includes entirely novel facilities for performing the functions of—

(1) Self-allotment of individual finder-connector links to successive calling lines coupled with automatic line busying as each link is taken into use to handle a call.

(2) Dial tone transmission to the calling substation when a finder-connector link is assigned to the calling line.

(3) Dial controlled impulsing (3 digits) to effect selection on a decimal basis of any called line in the 100 line group and to effect selection on a decimal basis of the party line ringing signal assigned to any party line substation connected to the called line.

(4) Automatic dial tone cutoff in response to initiation of the dialing operation.

(5) Busy testing the called line incident to the selection thereof and the transmission of a busy tone signal to the calling substation in the event the called line tests busy.

(6) Simultaneous ringing of all of the substations connected to the called line in accordance with the party line ringing signal assigned to the called party line substation in the event the called line tests idle, and the transmission of a corresponding ringback tone signal to the calling substation during the ringing intervals.

(7) Automatic ringing cutoff and ringback tone signal cutoff when the called subscriber answers.

(8) Guarding each called line against intrusion as the result of an incoming call thereto in response to assignment of a finder-connector link to the calling line, and guarding of a called line against intrusion as a result of a subsequently initiated call thereto after it has been selected as a called line.

(9) Automatic release of the link occupied with the call incident to the release of the connection at the calling substation.

All of the above functions are accomplished on a fully automatic basis without the use of any relays, stepping switches, or other equivalent mechanical devices having moving parts. With the exception of the line circuits all equipment provided in the system to perform the described functions is common to the lines of the system, whether private or party, thus minimizing duplication of system components.

Basically the present improved system uiltizes a system of multiplexing, namely pulse sampling effectively at an ultrasonic rate of the control and intelligence signals produced at each substation of the system, to provide signal channel separation. Specifically, each line of the system is assigned a particular pulse time position in each of repetitive pulse frames each comprising one hundred pulse time positions. Intelligence and control signals developed on any one line of the system are sampled only in the particular pulse time position assigned to the particular line and the samples are carried through the signal transmitting components of the system as far as the connector stage on multiplexer signal pulses occurring in this particular time position. In the connector stage the control and intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation.

In order to minimize the amount of equipment used in certain components of the system, a decimal system of multiplexing is employed which entails arbitrary division of the lines of the system into subgroups. More specifically, the one hundred lines of the system are divided into ten subgroups of ten lines each, and tens multiplexing or gating pulses are developed at the rate of ten pulses for each pulse frame. Each tens pulse individually corresponds to a particular subgroup of ten lines and occurs during the time interval of each pulse frame which exactly spans the ten pulse time positions individually assigned to the lines of the particular subgroup. With this system of multiplexing, transmission of multiplexer signal pulses through certain of the signal transmission components of the system is dependent upon time coincidence of these signal pulses with particular tens pulses of successive pulse frames a well as coincidence of these pulses with particular pulse time positions within successive pulse frames.

In order to provide for party line ringing of all of the substations associated with any one of the lines of the system in accordance with different party line ringing signals which are assigned to these substations on a decimal basis, a party line ringing signal cycle having a duration of approximately 7½ seconds is established during which ten different party line ringing codes are produced and may be selected in the connector on a third or party line digit basis to effect ringing of all of the substations associated with the called line in accordance with the particular party line code ring assigned to the particular called substation.

GENERAL DESCRIPTION OF THE SYSTEM

Referring now to the drawings and more particularly to Figs. 1, 2, 3 and 4 thereof, the present fully automatic electronic telephone system is there illustrated as comprising line circuits 10, 16, etc., individual to the one hundred lines of the system, a multiplexer 11 of which only one is required in the system, a plurality of identical finder-connector links 12, 13 and 14, a talking distributor 15 of which only one is required in the system, a ringing control distributor **15*a* of which only one is required in the system, and the common equipment indicated generally at 17 in Fig. 4 of the drawings. Each of the finder-connector links is comprised of a finder and a connector, the illustrated links respectively comprising finders 12*a*, 13*a* and 14*a* and connectors 12*b*, 13*b* and 14*b*. It will be understood that the number of finder-connector links employed in the system may be chosen as required to handle the traffic. Although only three links 12, 13 and 14** have been illustrated, from seven to ten links will normally be required in actual practice to handle the traffic of a one hundred line exchange. Inclusion of the additional links in the system may easily be accomplished by connecting appropriate terminals of additional links to the indicated multiple points.

As shown, the line circuits 10 and 16 respectively terminate the two-conductor lines which are respectively identified by the designations 23 and 32. The lines 23 and 32 may be used for either private or party line service. In the illustrated embodiment the line 23 is shown as a private line and accordingly extends only to the single substation A having the directory number designation No. 231. On the other hand the line 32 is shown as a party line and extends to a plurality of parallel connected substations, such as the substations B, C, and D having respectively assigned thereto the directory number designations No. 322, No. 323, and No. 324. Each line circuit performs the functions of repeating intelligence or control signals from its associated substation or substations to a corresponding one of the gate circuits in the multiplexer 11, repeating intelligence signals derived from a particular gate circuit of the distributor 15 to its associated substation or substations, and of responding to party line ringing control signals derived from one of the connectors **12*b*, 13*b* or 14*b* by way of the ringing control distributor 15*a* to transmit ringing current to the associated substation or substations on a call incoming thereto. To perform these functions, the line circuit 10 is connected by way of the conductors 53*a* and 53*b* to one of the gate circuits provided in the multiplexer 11, and is connected by way of the conductors 44*a* and 44*b* forming the illustrated cable 44 to one each of the gate circuits provided in the ringing control distributor 15*a* and the talking distributor 15. The line circuit 10 is also connected to certain components of the common equipment 17 in the manner described below. Similarly, the line circuit 16 is connected by way of the conductor 54*a* to one of the gate circuits in the talking distributor 15, by way of the conductor 54*b* to one of the gate circuits in the ringing control distributor 15*a* and by way of the conductors 45*a* and 45*b*, which form the illustrated cable 45 to one of the gate circuits in the multiplexer 11. This line circuit is also connected to certain components of the common equipment 17 in the manner pointed out below. The other ninety-eight line circuits of the system are likewise connected on an individual basis to corresponding gate circuits of the multiplexer 11** and the distributors 15 and 15*a* and on a common basis to certain components of the common equipment 17.

Generally speaking, the multiplexer 11 performs the functions of sampling the intelligence and control signals derived from the one hundred line circuits of the system only in the pulse time positions of each pulse frame individually assigned to the lines served by these line circuits, and of modulating the sampled intelligence or control signals on the multiplexer signal pulses occurring in these pulse time positions for transmission to the finders and connectors of the plurality of links 12, 13 and 14. To this end, the output terminals of the multiplexer 11 are connected by way of the common conductor 50 to the multiplexer input terminals of each of the finders 12*a*, 13*a* and 14*a* and also to the multiplexer input terminals of each of the connectors 12*b*, 13*b* and 14*b*. In reverse manner, the talking distributor 15 performs the function of repeating intelligence signals derived from the connectors 12*b*, 13*b* and 14*b* in pulse time positions corresponding to particular calling and called lines to the line circuits respectively terminating the lines and the ringing control distributor 15*a* performs the function of repeating party line ringing control signals derived from the connectors 12*b*, 13*b* and 14*b* in pulse time positions corresponding to particular called lines to the line circuits terminating these lines. The ringing control distributor 15*a* does not perform any intelligence transmission functions but instead functions solely as a ringing signal control unit. To these ends, the input terminals of the talking distributor 15 are connected by way of the common conductor 51 to the output terminals of each of the connectors 12*b*, 13*b* and 14*b*, and the input terminals of the ringing control distributor 15*a* are connected by way of the common conductor 51*a* to another set of output terminals of each of the connectors. In performing the described functions, the multiplexer 11 and the distributors 15 and 15*a* are controlled by certain components of the common equipment 17 in the manner hereinafter explained.

The finders of the various links, such, for example, as the finder 12*a*, do not perform any intelligence transmission functions. On the contrary, they function strictly as control units. Specifically, the finder 12*a* is provided to perform the function of determining when the link 12 shall be taken into use, determining the calling line with which the link is to be associated in handling a call, and determining the particular pulse time position of successive pulse frames which is assigned to the calling line and during which signal bearing pulses derived from the multiplexer 11 shall be effective to produce a response in the finder and in the associated connector 12*b*. To advise the connector of the pulse time position assigned to the calling line, the finder 12*a* transmits finder gate pulses to the connector in this pulse time position over the conductor 12*d*. The finder 12*a* also performs the function of conditioning its associated connector 12*b* for operation when the link 12 is definitely associated with a calling line to handle the call initiated on the line. This is accomplished through operation of the finder 12*a* to impress operating anode potential upon a plurality of the tubes in the connector 12*b* over the +B switch conductor 12*c*. When operatively associated with a particular calling line, the finder 12*a* also performs the function of guarding the calling line against intrusion on an incoming call to the line. This is accomplished through operation of the finder 12*a* to feed busy pulses occurring in the particular pulse time position assigned to the calling line with which the finder is operatively associated over the common busy pulse out conductor 52*a* to the link coupling circuits 24 in the common equipment 17. From the link coupling circuits 24 the busy pulses are fed to the common busy pulse in conductor 52*b* which is multipled to each of the finders and connectors of the system. The finder 12*a* further performs the function of supplying an allotting signal to the finders 13*a* of the next succeeding link 13 when the finder 12*a* is taken into use so as to provide a self-allotting system for the finder-connector links of the system.

To perform the above functions in the manner fully explained below, the finder 12*a* comprises (see Figs. 2A, 5 and 6) a pulse input circuit 200, a +B switching circuit 201, a pulse combining circuit 202, tens and units coincidence tube circuits 203 and 204, a finder pulse forming circuit 205 and a self-allotting circuit 206. It will be noted that the finder 12*a* and connector 12*b* are connected on an individual link basis by only two conductors, namely the +B switch conductor 12*c* and the finder gate pulse conductor 12*d*. The finder 13*a* and connector 13*b* of the link 13 are similarly connected on an individual link basis by means of the finder gate and +B switch conductors 13*d* and 13*c* which respectively correspond to the conductors 12*d* and 12*c* of the link 12. Similarly, the finder gate and +B switch conductors 14*d* and 14*c* are provided to connect the finder 14*a* and connector 14*b* of the link 14.

Each of the connectors 12*b*, 13*b* and 14*b* performs a plurality of different functions. Thus the connector 12*b*, for example, is controlled by finder gate pulses delivered thereto over the conductor 12*d* to accept and respond to signal bearing multiplexer pulses occurring in the pulse time position corresponding to the calling line with which the link is associated. It also responds to the application of operating anode potential to the conductor 12*c* and to the finder gate pulses appearing on the conductor 12*d* to feed a dial tone signal to the talking distributor 15 on connector signal pulses occurring in the pulse time position assigned to the calling line with which it is operatively associated, thereby to return the usual dial tone signal to the calling subscriber. The connector 12*b* is also adapted for party line ringing and responds to dial pulses (a tens digit, a units digit, and a third digit called the party line or code ringing digit) originating at the calling line with which the link 12 is operatively associated to select the particular pulse time position assigned to the called line and the particular party line ringing signal assigned to the called substation associated with the called line. Incident to the selection of this time position, the connector 12*b* conditions itself to accept signal carrying pulses from the multiplexer 11 which occur in the pulse time position corresponding to the selected called line, to store the intelligence carried by these pulses, and to transmit the intelligence to the distributor 15 on connector signal pulses occurring in the pulse time position corresponding to the calling line with which the link 12 is operatively associated. In effect, therefore, the connector functions to shift signal carrying pulses from the pulse time position assigned to the calling line to the pulse time position assigned to the called line, and also to shift return signal pulses carrying intelligence derived from the called line from the particular pulse time position assigned to the called line to the particular pulse time position corresponding to the calling line. In addition, the connector 12*b* performs the auxiliary functions of terminating dial tone transmission to the calling substation when the first line selecting impulse is dialed into the connector; feeding busy pulses occurring in the pulse time position assigned to the called line over the common busy pulse out conductor 52*a* to the link coupling circuits 24 in the common equipment 17, and from the link coupling circuits 24 over the common busy pulse in conductor 52*b* to the other links of the system, thereby to guard the called line against seizure through another link; testing the pulse time position assigned to the called line to determine the idle or busy condition of that line; transmitting busy tone carrying pulses to the talking distributor 15 in the pulse time position assigned to the calling line in the event the called line tests busy; transmitting a party line ringing signal in accordance with the identity of the called substation associated with the called line by way of the ringing control distributor 15*a* to the line circuit terminating the called line in the event the called line tests idle, concurrently transmitting pulses which are modulated with a corresponding ringback tone signal to the talking distributor 15 in the pulse time position assigned to the calling line, thereby to signal the calling subscriber that the called substations associated with the called line are being rung; and terminating the party line ringing signal and concurrently terminating ringback tone signal transmission to the calling substation in response to answering of the call at the called party line substation. The connector **12*b* is also arranged to release in response to the release of a connection involving the link 12** at the calling substation.

To perform the above-mentioned functions in the manner fully explained below, the connector **12*b*, as diagrammatically illustrated in Fig. 2B and as shown in detail in Figs. 8, 9, 10, 11, 14, 15, 16, and 17, is provided with a calling line in gate circuit 207 which responds to finder gate pulses transmitted to the connector over the conductor 12*d* to repeat signal bearing pulses delivered thereto from the multiplexer 11 in the pulse time position assigned to the calling line, and a calling line reconstructor circuit 208 having the function of detecting or reconstructing and storing the intelligence carried by signal bearing pulses transmitted to the connector from the multiplexer 11 in the pulse time position assigned to the calling line. The connector 12*b* further comprises a called line out gate circuit 224 for gating to the talking distributor 15 connector signal pulses carrying the intelligence reconstructed by the circuit 208 in the time position assigned to a particular called line. In addition, the connector 12*b* includes a called line in gate circuit 223 for repeating multiplexer pulses in the pulse time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12*d* to gate to the talking distributor 15 signal bearing connector pulses which occur in the pulse time position assigned to the calling line. More generally, the three circuits 207, 208 and 224 function to repeat intelligence from the calling line to the called line, whereas the three corresponding circuits 223, 222 and 226** function to repeat to the calling line intelligence derived from the called line.

The connector **12*b* of the present invention is adapted for party line service and additionally comprises a plurality of components for responding to three digits of dial pulses repeated to the connector on multiplexer pulses occurring in the pulse time position assigned to the calling line, the third digit corresponding to the particular party line ringing signal assigned to the called party line substation. In general, the dial pulse responsive equipment of the connector 12*b* comprises a dial impulse integrator circuit 209 which receives dial impulses from the reconstructor circuit 208, tens, units and party inverter circuits 260, 261 and 262, respectively, to which pulses are repeated by the dial impulse integrator circuit 209, the units and party inverter circuits 261 and 262 also acting as start gate circuits for the units and party digit channels, respectively; tens, units and party digit registers 211, 215 and 265 which are respectively controlled in accordance with the numerical values of the tens, units and party digits repeated to the circuits 260, 261 and 262 from the integrator circuit 209; tens, units and party register pulsers 210, 214 and 263 which are respectively interposed between the inverter circuit and the digit register of the tens, units and party digit channels, and tens, units and party sequence timing circuits 212, 216 and 264** which in effect function as the digit counting components of the connector, i. e., initiate certain operations at the ends of the first, second and third digits dialed into the connector.

The connector **12*b* further comprises a connector pulse forming circuit 217 which is controlled in accordance with the settings imparted to the tens and units digit registers 211 and 215 at the end of a dialing operation to produce connector pulses which are employed to control the circuits 222, 223 and 224 in the transmission of intelligence and control signal information from the connector to the talking distributor 15 in the pulse time position assigned to the called line. The busy test facilities of the connector comprise a busy test circuit 218 jointly controlled by the connector pulse forming circuit 217 and busy pulses transmitted to the connector over the common busy pulse in conductor 52*b*, a busy lock circuit 219 and a busy gate circuit 220. In addition, the connector 12*b* comprises supervisory tone gate circuits 225 having the function of gating dial and busy tones to the calling line and including a ringback tone gate circuit having the function of gating a particular party line ringback tone signal selected by the party digit register 265 in accordance with the identity of the called substation associated with the called line to the calling line, a code start circuit 268 which performs the function of delaying the transmission of the selected party line ringback tone signal through the ringback tone gate circuit until the start of a party line ringing cycle, a called line ringing out gate circuit 270 which is controlled by the ringback tone gate circuit and gates a ringing control signal to the ringing control distributor 15*a* over the conductor 51*a*, said ringing control signal comprising connector pulses which occur in the pulse time position assigned to the called line and are produced only during the ringing intervals of the party line ringing signal corresponding to the identity of the called substation associated with the called line, and a ring trip circuit 221 which is assigned the function of terminating ringing control signal transmission to the ringing distributor 15*a* and ringback tone signal transmission to the talking distributor 15** when a call answering operation is performed at the called substation.

Generally considered, the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator 18, the phase shifter and pulse former network 19 functions continuously to develop two identical trains of shaped pulses having a common pulse frequency of one megacycle, which are transmitted over the channels 40 and 41, respectively, to a units pulse ring circuit 20 and a commutator drive circuit 25. The phase relationship between the pulses respectively produced in the channels 40 and 41 by the network 19 may be shifted as desired through adjustment of certain of the components of this network in the manner more fully explained below. As controlled by the phase shifter and pulse former network 19, the units pulse ring circuit 20 functions sequentially to develop the units pulses which define the pulse time positions of the pulse frames, appear on the conductors within the cables 31 and 30, respectively, and are fed by way of these conductors to the various intelligence transmitting and control components of the system. More specifically, the cable 30 comprises ten units pulse conductors **30*a*, 30*b*–30*j* over which negative units pulses are sequentially transmitted in the order named to the units coincidence tube circuits 204 of the finders 12*a*, 13*a* and 14*a* and the units digit registers 215 of the connectors 12*b*, 13*b* and 14*b***.

In time coincidence with the described negative units pulses, the ring circuit 20 produces positive units pulses on the ten units pulse conductors **31*a*, 31*b*–31*j*** forming the cable 31, which are transmitted to the gate circuits of the talking distributor 15 and also to the pulse gate circuits of a channel pulse commutator 22. The positive units pulses developed upon the two conductors 31*a* and 31*f* are also employed to control a supervisory carrier supply circuit 26. Furthermore, the positive units pulses developed on the conductors 31*a*, 31*b*–31*j* are transmitted to the one hundred line circuits of the system in accordance with the units digit of the directory number designation assigned to the line associated with each of the line circuits to control, in conjunction with the ringing control distributor 15*a*, the transmission of ringing current to each of the lines of the system in the manner fully described below. Thus, the line circuit 10, which serves the line 23, is supplied with positive units pulses occurring in the third units pulse time position over the conductor 31*c*. These same units pulses are supplied over the conductor 31*c* to the nine other line circuits of the system associated with the lines in the units digit group No. 3. Likewise, the line circuit 16, which is associated with the line 32 is supplied with positive units pulses occurring in the second units pulse time position over the conductor 31*b*. These same units pulses are supplied over the conductor 31*b* to the nine other line circuits of the system associated with the lines in the units digit group No. 2. The positive and negative units pulses are sequentially developed on the units leads 31 and 30, respectively, at a frequency rate of 100 kilocycles and each tenth positive units pulse, i. e., each pulse appearing on the units pulse conductor 31*j*, is used to step or trigger a tens pulse ring circuit 21 having the function of developing the positive and negative tens pulses, each of which spans the time interval of ten units pulses. The positive tens pulses as sequentially produced by the ring circuit 21 on the tens pulse conductors 32*a*, 32*b*–32*j* forming the cable 32 are impressed upon the gate circuits of the multiplexer 11, the tens pulse gate circuits of the talking distributor 15 and the pulse gate circuits of the ringing control distributor 15*a* in the manner more fully explained below. The negative tens pulses as produced by the ring circuit 21 in time coincidence with the positive tens pulses and as sequentially impressed on the tens pulse conductors 33*a*, 33*b*–33*j* forming the cable 33 are impressed on the tens coincidence tube circuits 203 of the finders 12*a*, 13*a* and 14*a* and the tens digit registers 211 embodied in the connectors 12*b*, 13*b* and 14*b*, all in the manner more fully explained below.

As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34*a*, 34*b*– 34*j* forming the cable 34, which are fed to the gate circuits of the multiplexer 11. These channel pulses occur at the same frequency as the units pulses, but are much narrower in width. For example, the channel pulses appearing on the conductor 34*a* are much narrower than the units pulses appearing on the positive units pulse lead 31*a* and are preferably so phased relative to the units pulses that each channel pulse occurs well within the limits of the coincident positive units pulse. Commutator drive pulses as derived from the commutator drive circuit 25 are also transmitted directly over a commutator drive pulse conductor 35 to the out gate circuits 224 and 226 of each of the connectors 12*b*, 13*b* and 14*b*.

As indicated above, the line circuits 10, 16, etc., individually terminating the lines of the system, perform the function of transmitting ringing current to their respective associated substations. Ringing current transmission from any line circuit terminating a called idle line to the substations associated therewith is effected in accordance with the identity of the called substation as determined by the party line ringing signal corresponding to the third digit of the directory number designation assigned to the particular called substation and under the control of a ringback tone generator 29*c*, a code forming circuit 27*a*, a code modulator circuit 27 and a ringing supply circuit 60, which components are embodied in the common equipment 17, in the manner fully described below. The code forming circuit 27*a* operates independently of the other components of the common equipment 17 to develop ten party line ringing signals which are coded in different dot-dash arrangements and which are all completed during each one of successive ringing cycles. The code forming circuit also performs the function of developing a code start pulse coincident with the start of each ringing cycle which is multipled over the conductor 5 to all of the connectors 12*b*, 13*b*, 14*b*, etc. of the system. The ringback tone generator 29*c* performs the function of developing a continuous, audible ringback tone signal which is supplied over the conductor 27*b* to the code modulator circuit 27. The code modulator circuit 27 performs the function of separately gating the continuous ringback tone signal developed by the generator 29*c* in accordance with each of the code signals developed by the code forming circuit 27 to provide ten different ringback tone signals which are interrupted in accordance with the code signals developed by the circuit 27*a* and are supplied to the party digit registers of each of the connectors 12*b*, 13*b* and 14*b* over the conductors 48*a*, 48*b*–48*j* forming the illustrated cable 48. The ringing supply circuit 60 includes a combined bias voltage and 20 cycle ringing current source which is connected to each of the line circuits 10, 16, etc., over the common multiple conductors 61*a* and 61*b* forming the illustrated cable 61. The common equipment also includes a busy tone generator 29*a* and a dial tone generator 29*b* which are respectively connected by way of the multiple conductors 46 and 47 to the supervisory tone gate circuits 225 of each of the connectors 12*b*, 13*b* and 14*b*.

The common equipment 17 further comprises the link coupling circuits 24 which include a busy pulse drive channel for repeating busy pulses supplied thereto over the common busy pulse out conductor 52*a* to the busy pulse in conductor 52*b* which is multipled to the finders and connectors of all the links of the system, and a supervisory carrier drive channel for repeating the 100 kc. supervisory carrier supplied thereto over the conductor 37 from the supervisory carrier supply circuit 26 to the self-allotting circuit 206 of the finder 12*a* over the conductor 36*a* to permit the finder 12*a* to handle the first incoming call.

In order to render the mode of operation of the system more readily understandable, a pulse chart has been illustrated in Figs. 10 to 13, inclusive, to show the relative widths of the pulses developed by the common equipment components 19, 20, 21 and 22 during two successive pulse frames, as well as the time or phase relationship between the pulses. As there shown, the units pulse ring drive pulses 95*a*, appearing on the conductor 40 are produced by the phase shifter and pulse former circuit 19 along the zero potential reference line 95 at a frequency rate of one megacycle and are of positive polarity. Similarly, the channel pulse commutator drive pulses 96*a* appearing on the conductors 41 and 35 are produced by the phase shifter and pulse former network 19 along the zero potential reference line 96 at the same frequency of one megacycle and are of positive polarity. It will be noted that both the units pulse ring drive pulses 95*a* and the commutator drive pulses 96*a* are very narrow, i. e., persist for very short time intervals, and that the pulses 96*a* are so displaced in time relative to the pulses 95*a* that each commutator drive pulse 96*a* occurs approximately at the middle of the period separating the preceding and succeeding units pulse ring drive pulses 95*a*. The positive units pulses appearing respectively on the units pulse conductors 31*a*, 31*b*–31*j* and the negative units pulses coincidentally appearing on the units pulse conductors 30*a*, 30*b*–30*j* are produced along the zero potential reference lines 62, 63–71. More specifically, the positive units pulses produced along these potential reference lines and appearing on the units pulse conductors 31 are shown in solid lines, whereas the coincident negative units pulses produced along the same reference lines and appearing on the units pulse conductors 30 are shown in dash lines. It will be noted that the units pulses are produced by the units pulse ring circuit 20 at the fundamental frequency rate of one megacycle. However, due to diversion of the pulses successively to different ones of the units pulse conductors *a*, *b*–*j*, the pulses along any particular zero potential reference line, such, for example, as the line 62, recur only at a frequency rate of one hundred kilocycles. It will also be noted that the units pulses, both positive and negative, are successively produced on the units pulse conductors 30 and 31 in the order of alphabetical designation of these conductors. Thus, successive positive and coincident negative units pulses produced along any particular zero potential reference line, as, for example, those occurring during the units pulse periods 62*a*, 62*b*, 62*c*, etc., along the potential reference line 62, are separated by a time interval equaling the sum of nine units pulse time positions and during which units pulses are produced successively along each of the nine other zero potential reference lines.

The negative tens pulses successively produced by the tens pulse ring circuit 21 on the tens pulse conductors 33*a*, 33*b*–33*j* and the positive tens pulses coincidentally produced on the tens pulse conductors 32*a*, 32*b*–32*j* are illustrated as appearing along the ten zero potential reference lines 72 to 81, inclusive. Here also, the positive tens pulses are shown in solid lines, whereas the coincidentally produced negative tens pulses are shown in dash lines. It will be noted that each tens pulse persists for a time interval exactly equaling the time required to produce ten units pulses. Thus the positive and negative tens pulse periods 72*a* persists for the duration of the interval in which the ten units pulses 62*a*–71*a* are successively produced by the units pulse ring circuit 20. It will also be noted that the starting point of each tens pulse period 72*a*, 73*a*, 74*a*, etc., is exactly coincident with the starting points of the positive and negative units pulses 62*a*, 62*b*, 62*c*, etc., appearing along the zero potential reference line 62 and impressed upon the units pulse conductors 30*a* and 31*a*, respectively, by the units pulse ring circuit 20. Further, each tens pulse period terminates at the exact instant of termination of the positive and negative units pulses 71*a*, 71*b*, 71*c*, etc., appearing along the zero potential reference line 71 and produced by the units pulse ring circuit 20 on the conductors 30*j* and 31*j*, respectively. The described synchronism between the time positions of the tens pulses and the time positions of the units pulses successively produced on the units pulse conductors by the ring circuit 20 is obtained and maintained by employing the trailing edges of the positive units pulses appearing on the last positive units pulse conductor 31*j* to step or trigger the tens pulse ring 21 on a periodic basis.

The channel pulses which are successively produced on the ten channel pulse conductors 34*a*, 34*b*–34*j* by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96*a* appearing along the zero potential reference line 96. Like the positive and negative units pulses, the channel pulses are produced at the fundamental frequency rate of one megacycle, but due to the action of the commutator 22 in diverting these pulses successively to the conductors 34*a*, 34*b*–34*j* recur only on each of these conductors at a rate of one hundred kilocycles. Thus the channel pulses 82*a*, 82*b*, 82*c*, etc., appearing along the reference line 82 and impressed on the conductor 34*a* are spaced apart timewise by like intervals each of which exactly equals the sum of ten units pulse time periods. During this spacing interval, nine additional channel pulses are successively produced along the reference lines 83, 84–91 to appear on the conductors 34*b*, 34*c*–34*j*. It will also be noted that the channel pulses are very narrow in width, having a persistence interval of the order of one-fifth the persistence interval of the units pulse time period. Moreover, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95*a*, to open the gating circuits of the channel pulse commutator 22 in the manner more fully explained below. The purpose of thus positioning the signal bearing pulses in the units pulse time positions is that of insuring transmission of these pulses through the units gate circuits of the signal handling components of the system while these gate circuits are open despite slight variations in relative positions of the units pulses and the signal bearing pulses occasioned by circuit delays.

With the above general description of the pulse chart illustrated in Figs. 10 to 13, inclusive, in mind, it will readily be understood that each pulse frame is divided into one hundred readily identifiable pulse time positions. Thus the first ten pulse time positions of each pulse frame, which are respectively assigned to the lines of the system having the directory number designations 11, 12–10, are defined by the first tens pulse period 72*a* of the frame within which the ten units pulse periods 62*a*, 63*a*, 64*a*–71*a* occur. Similarly, the second ten pulse time positions, which are respectively assigned to the lines of the system having the directory number designations 21, 22, 23–20, are defined by the second tens pulse period 73*a* during which the ten units pulse periods 62*b*, 63*b*, 64*b*–71*b* occur. Again, the third ten pulse time positions, which are respectively assigned to the lines of the system having the directory number designations 31, 32, 33–30, are marked out by the third tens pulse time period 74*a* during which the ten units pulse periods 62*c*, 63*c*, 64*c*–71*c* occur. Thus it will be understood that the pulse time position of each pulse frame which is assigned to the illustrated line 23 occurs during the second tens pulse interval 73*a* of each pulse frame and is coincident with the units pulse period 64*b* of each pulse frame. It will also be apparent that the corresponding signal pulse 84*b* occurs well within the limits of this pulse time position. Similarly, the pulse time position assigned to the illustrated line 32 occurs during the third tens pulse time interval 74*a* of each pulse frame and is coincident with the second units pulse period 63*c* of each pulse frame. Here again, each channel pulse 83*c* corresponding to the line 32 occurs well within the limits of the particular pulse time position assigned to the line 32 in each pulse frame.

In order further to render the mode of operation of the party line ringing system of the present system more readily understandable, a code ringing chart has been illustrated in Figs. 14 and 15 to show the time and phase relationship of the signals developed by the code forming circuit 27*a* and the code modulator circuit 27 in the common equipment 17 during one code ringing cycle. As there shown, code forming ring drive pulses 110 of positive polarity are developed in the code forming circuit 27*a* along the zero potential reference line 111 at a frequency rate of approximately one pulse every half second. The ring drive pulses 110 are delivered at intervals representing one code unit, there being in the illustrated embodiment fifteen successive code unit intervals in each code cycle. In this connection it will be understood that the code forming ring drive pulses 110 are not in synchronism with, and in fact are completely independent of, the time position system pulses shown in Figs. 10 to 13, inclusive, which latter pulses are controlled by the master oscillator 18. The code forming ring drive pulses 110 occur at the relatively low frequency of one such pulse for each one-half second and are used to control only the intervals during which the called substation is rung.

The code forming circuit **27*a* is provided with a series of fifteen pulse forming stages which individually develop the negative code forming pulses 120, 121–134, inclusive, which are successively produced during the fifteen code unit intervals constituting one code cycle. Thus, the pulses 120, which are produced by the first pulse forming stage in the code forming circuit 27*a* occur at the rate of one such pulse for each code cycle and appear in the first code unit interval of each code cycle. Likewise, the code forming pulses 121 are produced by the second pulse forming stage in the circuit 27*a* and occur during the second code unit interval of each code cycle. In an entirely similar manner the code forming pulses 122–134** are produced in the remaining code unit intervals of each code cycle.

In order to provide ten coded party line ringing signals having different dot-dash code sequences, certain ones of the code forming pulses 120–134, inclusive, are combined in various combinations to provide ten coded ringing signals which have been assigned the code ringing numbers 1 to 10, inclusive, shown in Fig. 15. Thus, the code forming pulses 130, 131, and 132 are combined to provide the code #1 ringing signal which comprises a single long ringing pulse 140. The code forming pulses 131 and 133 are combined to form the code #2 ringing signal which comprises the short ringing pulses 141 and 142 which are separated by an "off" interval 143 of the same duration. The code forming pulses 130, 132, and 134 are combined to form the code #3 ringing signal which comprises the three successive short ringing pulses 145, 146, and 147. In an entirely similar manner certain ones of the code forming pulses 120–134, inclusive, shown in Fig. 14, are combined to provide the remaining codes #4 to #10, inclusive, shown in Fig. 15. Thus, code #4 comprises a series of four short ringing pulses, code #5 comprises a long ringing pulse followed by a short ringing pulse, code #6 comprises a long ringing pulse followed by two short ringing pulses, code #7 consists of two successive long ringing pulses, code #8 consists of a short ringing pulse followed by a long ringing pulse, code #9 consists of a short ringing pulse followed by two successive long ringing pulses, and code #10 consists of two short ringing pulses following by a single long ringing pulse.

It will be noted that all of the codes numbers 1 to 10, inclusive, are completed within one code cycle which preferably has a duration of approximately 7½ seconds and the code ringing signal of each of these codes is repeated every 7½ seconds. Thus, the code #1 ringing signal comprises a single long ringing interval which lasts for approximately 1½ seconds and is repeated every 7½ seconds. Likewise, the code #2 ringing signal consists of two short ringing intervals of ½ second each of which are spaced apart by a silent interval of ½ second and are repeated every 7½ seconds.

The coded party line ringing signals developed by the code forming circuit **27*a* in the manner described generally above are supplied to the code modulator circuit 27 in the common equipment 17. This circuit includes a plurality of gate circuits individually responsive to different ones of said ringing signals and operative to transmit therethrough a ringback tone signal during the ringing intervals of the particular party line ringing signal. Thus, the code modulator 27 responds to the code #3 ringing signal by producing three short pulses 150 of ringback tone voltage (Fig. 15) during the ringing intervals of code #3. In this connection it will be understood that each of the pulses 150 has a duration of approximately one-half second and the ringback tone signal is in the audible range so that each of the pulses 150 includes a great many cycles of the ringback tone signal. The circuit 27 also responds to the code #9 ringing signal by producing the interrupted ringback tone signal comprising the pulses 152 (Fig. 15) which correspond to the one short and two long ringing intervals of this ringing signal. In an entirely similar manner the other eight coded ringing signals are converted into corresponding interrupted ringback tone signals and are supplied over the multiple conductor cable 48** to the connectors of the system.

With the above general description of the code ringing chart illustrated in Figs. 14 and 15 in mind, it will readily be understood that each code cycle is divided into fifteen successive code ringing intervals which are combined in the manner shown to provide ten separate and distinct code ringing signals which are used to provide distinctive party line ringing signals suitable for identifying to the called subscriber each of the party line substations, up to a maximum of ten, associated with one of the lines of the system. Thus, substation B associated with the line 32 and assigned the directory number designation 322 is identified by code #2 to distinguish this substation from the remaining party line substations, such as the substations C and D, associated with the line 32. When the substation B is called, all of the substations B, C, and D are rung in unison in accordance with the code #2 ringing signal which consists of two short ringing intervals which are repeated every seven and one-half seconds so that the party line subscribers at these substations may determine which one of the substations associated with the line 32 is being called. However, it will be understood that certain ones of the lines of the system may be adapted for private service in which case the private line will, of course, have only one substation associated therewith. Thus, in the illustrated embodiment the line 23 is adapted for private service and has associated therewith only the one substation A to which is assigned the directory number designation 231. The interrupted ringback tone signal corresponding to the particular code ringing signal assigned to the called substation associated with the called line is selected in the party digit register of the connector of the system operatively associated with the called line on a decimal basis in the same manner as the first and second digits in the directory designation thereof are selected, as will be described in detail hereinafter.

*Operation of the system as a whole*

Briefly to consider the general mode of operation of the system, it may be assumed that the party line substation B is called from the substation A during a period when the finder-connector link 12 is idle. When the receiver or hand set at the substation A is lifted from its supporting hook or cradle to initiate the call, a loop circuit including the conductors of the line 23 is closed to the line circuit 10, with the result that this line circuit immediately operates to change the magnitude of the bias potential which it delivers over the conductor **53*b* to the gating circuit of the multiplexer 11 which individually corresponds to the line 23. The multiplexer 11 responds to this change in magnitude of the controlling bias potential supplied thereto from the line circuit 10 by opening the gate corresponding to the line 23. Accordingly, only the signal pulses 84*b* occurring during the pulse time positions 64*b* of successive pulse frames, are permitted to pass over the common conductor 50 to the pulse input circuits 200 of the finders 12***a*, 13*a*, and 14*a* and the in gate circuits 207 and 223 of the connectors 12*b*, 13*b*, and 14*b* in parallel. At this point the pulses transmitted from the multiplexer 11 over the common conductor in the pulse time position 64*b* may be regarded as multiplexer pulses 84*b*. The finder-connector links of the system are arranged in a predetermined sequence and are allotted one at a time to successive calling lines of the system by means of the self-allotting circuits 206 contained in each of the finders 12*a*, 13*a*, and 14*a*. Initially, only the link 12 is conditioned by means of the self-allotting circuit 206 in the finder 12*a* to handle a call placed on a calling line of the system. However, when the link 12 is taken into use, the self-allotting circuit 206 in the finder 12*a* diverts a supervisory carrier signal to the finder 13*a* of the link 13 to condition this link to handle the next succeeding call. Accordingly, only the link 12 is conditioned to handle the first call and the connector 12*b* of this link is as yet inoperative so that only the finder 12*a* initially responds to the multiplexer pulses 84*b* delivered thereto from the multiplexer 11 over the conductor 50 in the described pulse time position 64*b*.

In the finder 12*a* the multiplexer pulses 84*b* are repeated by the pulse input circuit 200 to effect substantially immediate operation of the +B switching circuit 201 embodied in this finder, whereby operating anode potentials are delivered to the tubes of the circuits 209, 210, 211, 212, 214, 215, 216, 218, 219, 263, 264 and 265 of the connector 12*b* over the +B switch conductor 12*c* with the result that the connector 12*b* is conditioned for operation, i. e., conditioned to respond to signal carrying multiplexer pulses delivered thereto from the multiplexer 11 over the conductor 50. Operation of the +B switching circuit in the finder 12*a* also has the effect of conditioning the tens and units coincidence tube circuits 203 and 204 of this finder for operation under the joint control of the multiplexer pulses 84*b* repeated by the input circuit 200, the negative tens pulses developed by the tens pulse ring circuit 21 and the negative units pulses developed by the units pulse ring circuit 20.

In responding to the tens and units pulses impressed thereon coincidentally with the multiplexer pulses 84*b*, the tens and units coincidence tube circuits 203 and 204 of the finder 12*a* cooperate with the finder pulse forming circuit 205 and the combining circuit 202 of this finder to produce finder gate pulses which are transmitted over the conductor 12*d* to the circuits 207, 208 and 226 of the connector 12*b* and have the effect of initially limiting the response of the connector only to multiplexer pulses 84*b* appearing in the pulse time position 64*b*. The combining circuit 202 of the finder 12*a* also gates busy pulses in the pulse time position 64*b* which are fed over the common busy pulse out conductor 52*a* to the link coupling circuits 24 wherein the busy pulses are amplified and supplied over the common busy pulse in conductor 52*b* to all of the finders and connectors of the system to prevent these finders from responding to multiplexer pulses occurring in this time position. Thus, the line 23 is guarded against intrusion on an incoming call. In addition, the pulses gated by the circuit 202 to the conductor 12*d* are impressed upon the pulse input circuit 200, thereby to render the finder 12*a* responsive only to multiplexer pulses 84*b* appearing in the pulse time position 64*b*.

Operation of the +B switching circuit in the finder 12*a* has the further effect of causing the self-allotting circuit 206 of the finder 12*a* to divert the supervisory carrier control signal, normally supplied thereto over the conductor 36*a*, to the self-allotting circuit in the finder 13*a* of the next succeeding link 13 over the conductor 36*b* to condition the link 13 to handle the next incoming call. In an entirely similar manner, operation of the +B switching circuit in the finder 13*a* of the link 13 when this link is operatively associated with the next calling line has the effect of diverting the supervisory carrier control signal to the finder of the next succeeding finder-connector link 14 so that as one link is taken into use the seized link automatically allots the next succeeding link in the sequence to handle the next incoming call. After the finder 12*a* has operated to perform the described functions, continued holding of the finder 12*a* is dependent upon continued acceptance and transmission of multiplexer pulses 84*b* by the pulse input circuit 200, which of course means that the finder will remain associated with the calling line 23 only so long as a calling condition persists on this line.

As indicated above, when the +B switching circuit 201 of the finder 12*a* operates to apply operating anode potential to the conductor 12*c*, the circuits 209, 210, 211, 212, 214, 215, 216, 218, 219, 263, 264, and 265 of the connector 12*b* are conditioned for operation. Immediately anode potential is applied to the dial tone gating tube of the network 225, this network functions to transmit a dial tone signal, derived from the dial tone generator 29*b* over the conductor 47, to the calling line out gate circuit 226 over the conductor 244. This circuit is responding to the dial tone signal and also to the finder gate pulses delivered thereto over the conductor 12*d* and the commutator drive pulses 96*a* delivered thereto over the conductor 35, functions to repeat over the channel conductor 51 to the talking distributor 15 connector signal pulses modulated in accordance with the dial tone signal in the pulse time position 64*b* assigned to the calling line. The talking distributor 15 responds to the connector signal pulses thus transmitted thereto by repeating the same through the gate circuit thereof associated with the line circuit 10, reconstructing the dial tone and transmitting the reconstructed dial tone over the conductor 44*a* to the line circuit 10. In the line circuit 10, the dial tone signal is transmitted over the line 23 to signal the calling subscriber that the dialing operation may be initiated.

Two digits of dial impulses must be dialed into the connector 12*b* in order to effect selection in the connector of the pulse time position 63*c* assigned to the line circuit 16 associated with the called line 32 and a third successive digit, called a party line digit, must be dialed into the connector 12*b* in order to effect selection on a decimal basis of the particular party line ringing signal assigned to the called substation B having the directory number designation 322. More specifically, the directory number digits 3, 2 and 2 must be dialed successively into the connector 12*b* to effect selection of the pulse time position 63*c* and the code #2 party line ringing signal assigned to the called substation B. During the open circuit period of each dial impulse, the control bias supplied by the line circuit 10 to the gate circuit of the multiplexer 11 which corresponds to the calling line 23 is returned to its on hook value to interrupt the transmission of multiplexer pulses 84*b* over the conductor 50 to the pulse input circuit 200 of the finder 12*a* and to the in gate circuits 223 and 207 of the connector 12*b*. At this point, it is noted that the +B switching circuit has a fundamentally new time delay feature incorporated therein which prevents this circuit from removing operating anode potential from the conductor 12*c* during the open circuit periods of dial impulses, hook switch flashing and the like. Thus, premature release of the link 12 during dialing is positively prevented through the action of the +B switching circuit 201 to maintain operating anode potential upon the conductor 12*c* during the open circuit period of each dial impulse. With the +B switching circuit 201 operating to supply anode potentials to the tubes of the coincidence tube circuits 203 and 204 of the finder 12*a*, finder gating pulses continue to be transmitted over the conductor 12*d* to the circuits 207, 208, and 226 of the connector 12*b*. Thus, these circuits are held in condition to respond to intelligence and control signals delivered thereto from the multiplexer 11 on multiplexer pulses **84*b* impressed upon the conductor 50 in the pulse time position 64*b***.

During the make period of each impulse dialed at the calling substation A, multiplexer signal pulse transmission from the multiplexer 11 to the finder **12*a* and the connector 12*b* in the pulse time position 64*b* is resumed. As controlled by the finder gating pulses delivered to the circuits 207 and 208 from the circuit 202 over the conductor 12*d*, the circuits 207 and 208 function to repeat any intelligence or control signals derived from the calling line 23 to the dial impulse integrator circuit 209. This circuit differentiates between intelligence modulated multiplexer pulses and dial impulse modulated multiplexer pulses in such manner that only the latter appear at the output terminals of this circuit. More specifically, during each dial impulse generated at the calling substation A, the impulse integrator circuit 209 develops coincident impulses which are impressed upon the tens, units and party inverter circuits 260, 261 and 262 over the conductor 227. Pending operation of the tens sequence timing circuit 212, the units inverter circuit 261, which also performs the function of a units digit start gate, and the party inverter circuit 262, which also performs the function of a party digit start gate, are held non-responsive to the three impulses transmitted thereto by the dial impulse integrator circuit 209 during dialing of the first digit 3 at the calling substation. However, the tens register pulser 210 responds to these three impulses repeated thereto by the tens inverter circuit 260 over the conductor 231 by developing three coincident register drive pulses of uniform amplitude and duration which are supplied to the tens digit register circuit 211 and the tens sequence timing circuit 212 over the conductor 230. In responding to the three register drive pulses thus transmitted thereto, the tens digit register 211 is driven to a setting wherein tens pulses appearing on the negative tens pulse conductor 33*c* in the third tens pulse time position 74*a* of each pulse frame may be transmitted through the third tens gate of this register and over the conductor 232 to the connector pulse forming circuit 217. Transmission of the three register drive pulses individually corresponding to the three break periods of the first digit dialed at the calling substation over the conductor 230 to the tens sequence timing circuit 212 has the effect of conditioning this circuit to block the tens register pulser 210 from developing register drive pulses during dialing of the second and third digits and to render the units inverter circuit 261 operative to repeat the pulses delivered thereto by the dial impulse integrator circuit 209 during dialing of the second digit at the calling substation. Immediately the first register drive pulse is repeated to the tens digit register 211 to drive this register off normal, a control potential is developed on the conductor 233 which biases the dial tone gate tube of the network 225 beyond cutoff, such that dial tone transmission through this gate tube to the calling line out gate circuit 226 over the conductor 244** is terminated. Thus, transmission of the dial tone signal to the calling substation A is arrested.

During the interdigit pause which separates dialing of the first and second digits at the calling substation, the tens sequence timing circuit 212 assumes a stable operating condition wherein a controlling potential is impressed upon the conductor 234 to bias the tens register pulser 210 against developing further register drive pulses in response to impulses transmitted thereto through the tens inverter circuit 260 from the dial impulse integrator circuit 209. The above-described control potential is also supplied over the conductor 234 to the units inverter circuit 261 to render this circuit operative to repeat impulses delivered thereto from the dial impulse integrator circuit 209 to the units register pulser 214 and the units sequence timing circuit 216 over the conductor 238.

During dialing of the second digit 2 at the calling substation A, the dial impulse integrator circuit 209 responds by transmitting two impulses to each of the inverter circuits 260, 261, and 262. As noted above, however, the party inverter circuit 262 is still held non-responsive to these impulses and the tens register pulser 210 is now blocked against responding to these impulses. Thus, only the units inverter circuit 261 repeats the two impulses to the units register pulser 214 over the conductor 238 and the latter circuit responds to these impulses by developing corresponding register drive pulses of uniform amplitude and duration which are supplied to the units digit register 215 and the units sequence timing circuit 216 over the conductor 236. As a consequence, the units digit register 215 is operated or driven to open the second units gate circuit therein, thereby to establish a path for the transmission of units pulses appearing in the time positions **63*a*, 63*b*, 63*c*, etc., to the connector pulse forming circuit 217 over the conductor 245. The two pulses repeated to the units sequence timing circuit 216 over the conductor 236** serve to condition this circuit for operation at the end of the second digit.

During the interdigit pause which separates dialing of the second and third digits at the calling substation, the units sequence timing circuit 216 assumes a stable operating condition wherein a controlling potential is impressed upon the conductor 235 to bias the units register pulser 214 against development of register drive pulses in response to further impulses repeated thereto through the units inverter circuit 261 from the dial impulse integrator circuit 209. This controlling potential is also supplied over the conductor 235 to the party inverter circuit 262 to render this circuit operative to repeat impulses delivered thereto from the dial impulse integrator circuit 209 to the party register pulser 263 and the party sequence timing circuit 264 over the conductor 237.

During dialing of the third digit 2 at the calling substation A, the dial impulse integrator circuit 209 responds by transmitting two impulses to each of the inverter circuits 260, 261 and 262. As noted above, however, the tens and units register pulsers 210 and 214 are now prevented from responding to these impulses. Thus, only the party inverter circuit 262 repeats the two impulses to the party register pulser 263 over the conductor 237 and the latter circuit responds to these impulses by developing corresponding register drive pulses which are supplied over the conductor 240 to the party digit register 265 and the party sequence timing circuit 264. As a consequence, the party digit register is operated or driven to open the second party gate circuit therein, thereby to establish a path for the transmission of the interrupted ringback tone signal, corresponding to the code #2 party line ringing signal assigned to the called substation B, over the conductor 275 to the ringback tone gate tube to the network 225.

At the end of the third digit dialed into the connector **12*b* the party sequence timing circuit 264 operates to change the potential level on the conductor 242 to a value such that the party register pulser 263 is prevented from responding to further pulses. Concurrently, the change in potential level on the conductor 242 has the effect of rendering the busy test circuit 218 operative to determine the idle or busy condition of the called line 32 by testing the pulse time position 63*c*** assigned to this line.

The potential applied to the conductor 242 also has the effect of rendering the connector pulse forming circuit 217 operative to mix the tens and units pulses respectively transmitted thereto from the registers 211 and 215 over the conductors 232 and 245 to produce a resultant connector pulse which appears with different amplitudes on the conductors 239 and **239*a*. More specifically, the tens pulses 74*a* appearing on the negative tens pulse conductor 33*c* and gated by the tens digit register 211 are transmitted to the connector pulse forming circuit 217 over the conductor 232** where they are mixed with the negative units pulses appearing in the time position 63*c* which are gated by the units register 215 and transmitted to the circuit 217 over the conductor 245. Mixing of these pulses in the circuit 217 results in the production of a resultant connector pulse which occurs during each pulse frame in the pulse time position 63*c* assigned to the called line. These pulses are transmitted over the conductor 239 to the connector components 220, 222, 223, and 224 and over the conductor **239*a* to the connector component 218**.

Effectively, the busy test circuit 218 and the busy lock circuit 219 cooperate to perform the busy test operation in the connector **12*b*. More specifically, if the called line is busy, i. e., occupied with a call, busy pulses are present on the common busy pulse in conductor 52*b* in the pulse time position 63*c* assigned to the called line. The manner in which such busy pulses are repeated to the conductor 52*b* from another link occupied with the call involving the called line 32 will be apparent from the foregoing explanation. These busy pulses are impressed upon the busy test circuit 218 coincidentally with the connector pulses developed by the connector pulse forming circuit 217 and impressed upon the busy test circuit 218 over the conductor 239*a***. Coincidence between the connector pulses and the busy pulses has the effect of preventing the busy test circuit from operating. Thus, the busy condition of the called line is indicated.

In the event the called line is busy, the busy lock circuit 219 as controlled over the conductors 242 and 246 and through the resistor 247 from the party sequence timing circuit 264 measures a predetermined time interval, i. e., a busy test interval, following which it operates to feed a bias potential back over the conductor 248 which has the effect of positively blocking the busy test circuit 218 against subsequent operation. In operating, the busy lock circuit 219 also controls the busy tone gate of the network 225 over the conductor 250 to permit the usual busy tone signal to be repeated from the busy tone generator **29*a* by way of the conductor 46, the busy gate circuit in the network 225, the conductor 244, the calling line out gate circuit 226, the channel conductor 51, the talking distributor 15 and the line circuit 10 to the calling line 23**. Thus, the calling subscriber is advised of the busy condition of the called line.

Assuming that the called line 32 is idle at the time the pulse time position **63*c* assigned thereto is selected in the connector in the manner explained above, such busy pulses as may be present on the common busy pulse in conductor 52*b* do not occur coincidentally with the connector pulses generated by the connector pulse forming circuit 217 in the pulse time position 63*c* assigned to the called line. When coincidence between the connector pulses and the busy pulses is lacking, the busy test circuit operates immediately the first connector pulse is impressed thereon from the connector pulse forming circuit 217 over the conductor 239*a*. In operating, the circuit 218 impresses a positive potential upon the cut-through conductor 251 which is applied to the busy lock circuit 219 to prevent the latter circuit from operating at the end of the busy test interval. The positive potential applied to the cut-through conductor 251 in the busy test circuit 218 when this circuit operates is also applied to the called line out gate circuit 224 to condition the latter circuit to repeat connector signal pulses in the time position 63*c* to the talking distributor 15, and is applied to the busy gate circuit 220 so that connector pulses are released to the common busy pulse out conductor 52*a*. The positive potential developed on the cut-through conductor 251 is also applied to the called line in gate circuit 223 and the called line reconstructor circuit 222, thereby to condition these circuits to accept signals derived from the called line. This feature of making operation of the circuits 223 and 222** dependent upon operation of the busy test circuit to indicate that the called line is idle, is necessary in order to prevent the calling subscriber from listening in on a conversation being held over the called line when the called line is busy.

When the called line out gate 224 is conditioned for operation through application of the described positive potential to the cut-through conductor 251, it responds to the connector pulses impressed upon the connector pulse conductor 239 by the connector pulse forming circuit 217 by gating certain commutator drive pulses derived from the commutator drive circuit 25 over the conductor 35. More specifically, the commutator drive pulses transmitted over the conductor 35 by the commutator drive circuit 25 are gated by the connector pulses produced on the conductor 239 in the pulse time position **63*c* assigned to the called line 32, whereby very narrow connector signal pulses are released over the conductor 51 to the talking distributor 15 which are well within the limits of the pulse time position 63*c* assigned to the called line. However, it will be understood that until ringing of the called line is effected under the control of the ringing distributor 15*a*, the above described connector signal pulses supplied to the talking distributor 15 in the pulse time position 63*c*** are ineffective to establish talking communication with any of the substations associated with the called line.

The positive potential applied to the cut-through conductor 251 is also impressed upon the ring trip circuit 221 to enable this circuit to terminate ringing at the proper time and is applied to the code start circuit 268. When the positive potential on the cut-through conductor 251 is impressed upon the code start circuit 268 this circuit is rendered operative to develop a control potential in response to the next occurring code start pulse transmitted thereto from the code forming circuit **27*a* over the conductor 5 which control potential is impressed upon the ringback tone gate tube of the network 225 by way of the conductor 241. When this control potential is impressed upon the ringback tone gate circuit of the network 225 this circuit is rendered operative to gate the interrupted ringback tone signal corresponding to the code #2 party line ringing signal selected by the party digit register 265 to the calling line out gate circuit 226 over the conductor 244. The interrupted ringback tone signal is modulated on the signal pulses developed by the calling line out gate circuit 226 and thus transmitted by way of the conductor 51 to the talking distributor 15 wherein the interrupted ringback tone is reconstructed and supplied to the line circuit 10. In the line circuit 10, the ringback tone signal is transmitted over the calling line 23 to the calling substation A. Thus, the calling subscriber is informed that all of the party line substations, including the called substation B, associated with the called line 32 are being rung during the ringing intervals of the code #2 party line ringing signal assigned to the called substation B. This feature of making operation of the ringback tone gate circuit dependent upon operation of the code start circuit 268** to develop a control potential is necessary in order to prevent the ringback tone gate circuit from opening in the middle of a ringing cycle and gating only a portion of a given ringing signal which would result in an erroneous party line ring.

The ringback tone signal which is interrupted or keyed in accordance with the ringing intervals of the code #2 ringing signal assigned to the called substation B, and which is gated by the ringback tone gate circuit in the manner described above, is concurrently used to control the ringing operation at the line circuit 16 and the transmission of ringing current over the called line 32. Thus, the interrupted ringback tone signal gated by the ringback tone gate circuit is rectified to reproduce the code #2 party line ringing signal originally developed in the code forming circuit **27*a*** and consisting of two short ringing pulses. These ringing pulses are supplied to the called line ringing out gate circuit 270 over the conductor 269. Also, the narrow connector sampling pulses produced in the pulse time position 63c assigned to the called line by the called line out gate circuit 224 in the manner described above, are supplied to the called line ringing out gate circuit 270 over the conductor 271. The called line ringing out gate circuit 270 responds to the ringing pulses impressed upon the conductor 269 by the ringback tone gate circuit of the network 225 by gating connector sampling pulses occurring in the pulse time position 63c assigned to the called line and transmitted to the circuit 270 from the called line out gate circuit 224 over the conductor 271 to the ringing distributor channel conductor 51a during the ringing intervals of the code #2 party line ringing signal. So long as the positive potential applied to the cut-through conductor 251 in the busy test circuit 218 is fed to the code starting circuit 268, the called line ringing out gate circuit 270 is operative to release connector sampling pulses appearing in the pulse time position 63c to the ringing distributor 15a but only during the ringing intervals of the code #2 party line ringing signal assigned to the called substation B. In this connection it will be understood that the ringing distributor 15a functions strictly as a control unit in controlling the ringing facilities at the line circuit of the system and has no intelligence transmission or other supervisory signal transmission function.

In the ringing distributor 15a the connector sampling pulses, which appear on the conductor 51a during the ringing intervals of the selected party line ringing signal, are gated by the gate circuit corresponding to the tens group which includes the called line 32 and are supplied over the common conductor 54b to the line circuit 16 serving the called line 32. Thus, the ringing distributor 15a serves to distribute on a tens digit basis the ringing pulse modulated connector sampling pulses to the ten line circuits serving the ten lines of the system having the same tens digit directory designation.

In the line circuit 16 the connector sampling pulses distributed thereto by the ringing distributor 15a in the manner described above, are gated or distributed on a units digit basis by impressing these pulses upon a line ringing circuit to which there is also supplied positive units pulses derived from the units pulse ring 20 over the conductor 31b and occurring in the units pulse time position assigned to the called line 32, i. e., the second units pulse time position in each tens pulse period. Upon coincidence of the connector sampling pulses appearing on the conductor 54b and the units pulses appearing on the conductor 31b the line ringing circuit in the line circuit 16 has the effect of activating the ringing control facilities of the line circuit 16 with the result that ringing current is transmitted over the called line 32 and the ringers at each of the party line substations B, C, and D are rung in unison during the ringing intervals of the code #2 party line ringing signal assigned to the called substation B. As stated above, this ringing signal consists of two short ringing intervals of one-half second duration each of which are repeated every seven and one-half seconds.

Ringing of all the called party line substations persists until the call is answered at the called party line substation B or until the call is abandoned at the calling substation A. Assuming that the call is answered, the line circuit 16 functions to change the magnitude of the control potential supplied over the conductor 45b to the multiplexer 11 with the result that the gate circuit assigned to the line circuit 16 in the multiplexer 11 is opened to permit multiplexer pulses 83c occurring in the pulse time position 63c of each pulse frame to be transmitted through the multiplexer 11 and over the conductor 50 to the multiplexer input terminals of each of the finders and connectors of the system.

The multiplexer pulses 83c are impressed upon the calling and called line in gate circuits 207 and 223 in the connector 12b. In the calling line in gate circuit 207, the repeated multiplexer pulses 83c are not in coincidence with the finder gate pulses impressed upon the circuit 207 over the conductor 12d and hence are not repeated to the reconstructor circuit 208. However, in the called line in gate circuit 223 the multiplexer pulses 83c occur in time coincidence with the connector pulses impressed upon the circuit 223 over the connector pulse conductor 239 from the connector pulse forming circuit 217. As a consequence, the call answering signal carried thereby is gated to the reconstructor circuit 222 where it is detected to produce a potential on the conductor 252 which has the effect of tripping the ring trip circuit 221. In operating, the ring trip circuit 221 functions substantially to decrease the potential on the ring trip conductor 253 which has the effect of closing the ringback tone gate circuit of the network 225, with the result that transmission of the interrupted or coded ringback tone signal to the calling substation is arrested. When the ringback tone gate circuit of the network 225 is closed, rectified ringing pulses are no longer transmitted to the called line ringing out gate circuit 270 over the conductor 269 with the result that all transmission of connector signal pulses occurring in the pulse time position 63c over the conductor 51a to the ringing control distributor 15a is terminated. Since the ringing control facilities of the line circuit 16 depend for their operation upon the presence of ringing pulse modulated connector signal pulses in time coincidence with the units pulses appearing on the conductor 31b, cessation of the ringing pulse modulated connector signal pulses terminates the transmission of ringing current to the called line 32. Thus, the ringing operation is arrested.

Following the described operations in the connector 12b, a two-way talking or communication circuit is fully established between the calling substation A and the party line called substation B. Thus, voice or other signals developed at the substation A and transmitted over the line 23 to the line circuit 10 serve to vary directly the bias voltage impressed upon the gate circuit of the multiplexer 11 over the conductor 53a in accordance with the instantaneous amplitude of such signals. As a consequence, the multiplexer pulses 84b released by the multiplexer 11 over the conductor 50 to the finders and connectors of the system in the pulse time position 64b are modulated in accordance with the voice or other signals developed at the calling substation A. These signal modulated multiplexer pulses cannot be accepted by any finder of the system other than the finder 12a or any connector of the system other than the connector 12b because of the busy pulses fed to the busy pulse out conductor 52a from the circuit 202. In the finder 12a, the multiplexer pulses 84b maintain the +B switching circuit 201 operated to hold the link 12 associated with the line circuit 10. The signal modulated multiplexer pulses 84b are also transmitted through the calling line in gate circuit 207 and over the conductor 255 to the calling line reconstructor circuit 208 where they occur in time coincidence with the finder gating pulses impressed upon the reconstructor circuit over the conductor 12d in the pulse time position 64b. As a consequence, the voice signal components thereof are detected or reconstructed and stored in the reconstructor circuit 208. This stored signal information is impressed upon the called line out gate circuit 224 over the conductor 256. In the called line out gate circuit, the signals derived from the calling line reconstructor circuit 208 are modulated upon the connector signal pulses developed by the out gate circuit 224 in the pulse time position 63c assigned to the called line. These modulated signal pulses are transmitted to the talking distributor 15 over the conductor 51 wherein the signal components of the connector signal pulses are detected and released by the distributor 15 to the line circuit 16. In the line circuit 16, the detected signals are transmitted over the line 32 to the called substation B where they are audibly reproduced by the receiver of the telephone instrument provided at this substation.

Voice signals developed at the called party line substation B and transmitted over the line 32 to the line circuit 16 cause the bias potential delivered over the conductor 45*a* to the gate circuit of the multiplexer 11 which corresponds to the line circuit 16 to vary in exact accordance therewith. As a consequence, the voice signals are modulated upon the multiplexer pulses 83*c* occurring within the pulse time position 63*c* and released through the gate circuit of the multiplexer and over the conductor 50 to the finders and connectors of the system. These signal modulated multiplexer pulses cannot be accepted by any finder of the system for the reason that the finder 12*a* is synchronized to accept only multiplexer pulses 84*b* occurring in the time position 64*b* and the busy pulses fed to the busy pulse out conductor 52*b* in the time position 64*b* assigned to the called line by the busy gate circuit 220 of the connector 12*b* prevent the other finders from accepting or responding to the described signal modulated multiplexer pulses 83*c*. In the connector 12*b*, the signal modulated multiplexer pulses 83*c* are impressed upon the calling and called line in gate circuits 207 and 223 and are repeated by the circuit 223 over the conductor 254 to the called line reconstructor circuit 222. Due to lack of coincidence between the signal bearing multiplexer pulses 83*c* and the finder gating pulses impressed upon the calling line in gate circuit 207 over the conductor 12*d*, the circuit 207 does not gate these pulses to the reconstructor circuit 208. By virtue of the coincidence between the signal bearing multiplexer pulses 83*c* and the connector pulses appearing coincidentally on the conductor 239, both of which are impressed upon the called line reconstructor circuit 222, this circuit detects or reconstructs and stores the voice signal components carried by the multiplexer pulses 83*c*. The signals thus detected by the reconstructor circuit 222 are impressed upon the calling line out gate circuit 226 over the conductor 257. In the out gate circuit 226, the voice signals modulate the pulses developed in this circuit through gating of the commutator drive pulses impressed on the circuit over the conductor 35 by the finder gating pulses impressed on the circuit over the conductor 12*d*. The voice signal modulated pulses developed in the calling line out gate circuit 226 are supplied to the talking distributor 15 over the conductor 51 wherein the signal components thereof are detected and released to the line circuit 10. In the line circuit 10, the detected signals are transmitted over the line 23 to the calling substation A where they are audibly reproduced by the receiver of the telephone instrument provided at this substation.

As will be apparent from the foregoing explanation, a fully complete two-way talking circuit is established between the calling and called substations. Moreover, this circuit effectively comprises two mutually non-interfering channels between the calling line 23 and the called line 32 such that voice signals simultaneously produced at both substations will be transmitted without interference through the switching equipment of the system to the appropriate destination point or substation. However, it will be understood that each of the calling and called lines may have several party line substations associated therewith which are connected in parallel thereto so that the two-way talking circuits between the calling and called lines may be shared by a number, up to a maximum of ten, party line subscribers.

In describing the manner in which the system components 10, 11, 12*a*, 12*b*, 15, and 16 are partially or wholly released upon termination of the call, it may be assumed first that the called party at the party line substation B is the first to hang up. In such case, the bias potential delivered from the line circuit 16 over the conductor 45*b* to the gating circuit of the multiplexer 11 individually assigned to the line circuit 16 is restored to its normal value when the called line loop circuit is opened, with the result that multiplexer pulses 83*c* appearing in the pulse time position 63*c* are no longer transmitted over the conductor 50 to the finders and connectors of the system. Such termination of multiplexer pulse transmission in the time position 63*c* to the finders and connectors of the system has no effect other than inactivation of the connector components 223 and 222 and the removal of modulation components from the connector signal pulses transmitted by way of circuit 226 and the talking distributor 15 to the line circuit 10. In other words, busy pulses in the time position 63*c* assigned to the called line continue to be fed to the busy pulse out conductor 52*b* from the busy gate circuit 220 of the connector 12*b*, thereby to prevent substations associated with the called line 32 from originating a call or accepting an incoming call. This, of course, means that if the substation at any one of the substations associated with the called line picks up his receiver or hand set before the connection is released at the calling substation A, a two-way talking circuit between the calling and called lines is reestablished.

When the calling line subscriber disconnects by replacing the receiver or hand set at the substation A on its supporting hook or cradle, the loop circuit extending by way of the line 23 to the line circuit 10 is opened, with the result that the bias potential applied over the conductor 53*b* to that gate circuit of the multiplexer 11 which individually corresponds to the line circuit 10 is restored to its normal value. As a consequence, this gate circuit is biased to terminate the transmission of multiplexer pulses 84*b* occurring in the pulse time position 64*b* over the conductor 50 to the various finders and connectors of the system. When the transmission of multiplexer pulses 84*b* to the pulse input circuit 200 of the finder 12*a* is thus terminated, this circuit is rendered inactive to repeat pulses to the finder circuits, 201, 203, and 204. After a predetermined time interval, measured by the overall time constant of the +B switching circuit 201, this circuit responds to cessation of multiplexer pulse transmission thereto by removing the operating anode potential from the conductor 12*c*. As a consequence, the tens and units coincidence tube circuits 203 and 204 of the finder 12*a* are restored to normal to interrupt the production of finder gate and busy pulses in the pulse time position 64*b* by the finder pulse forming circuit 205. Thus, the application of pulses to the combining circuit 202 and hence to the busy pulse out conductor 52*a* in the pulse time position 64*b* assigned to the calling line 23 is arrested. Removal of the operating anode potential from the conductor 12*c* has the effect of rendering the self-allotting circuit 206 of the finder 12*a* operative to reassociate the link 12 with another calling line to handle another call. Cessation of busy pulse transmission to the busy pulse out conductor 52*a* in the pulse time position 64*b* has the effect of marking the calling line 23 as idle to permit initiation of a second call on this line or seizure of the line on a call incoming thereto.

Removal of operating anode potential from the conductor 12*c* also has the effect of restoring the component circuits 209, 210, 211, 212, 214, 215, 216, 218, 219, 263, 264, and 265 of the connector 12*b* to normal, thereby to condition the connector 12*b* to handle another call. Incident to normalizing of the connector pulse forming circuit 217, connector pulse production on the conductor 239 in the pulse time position 63*c* assigned to the called line 32 is terminated to arrest the application of busy pulses to the common busy pulse out conductor 52*a* by the busy gate circuit 220 in this pulse time position. Thus, the called line is unguarded to free the same for use in initiating another call or accepting a call incoming thereto.

It will be noted that normalizing of the identified circuits of the connector 12b has the effect of restoring all components of this connector to the condition which prevailed at the time the link 12 was taken into use to handle the call just described.

As will be evident from the immediately preceding explanation, the key component involved in effecting release of the link 12 is the +B switching circuit 201 embodied in the finder 12a. So long as multiplexer pulses are repeated to this circuit by the pulse input circuit 200 in the time position assigned to the calling line, the circuit positively prevents release of the link 12 and holds both the calling and called lines out of service, i. e., prevents use of the same in initiating outgoing calls or accepting incoming calls. However, when multiplexer pulse transmission by way of the pulse input circuit 200 to the +B switching circuit 201 is arrested for a period of time greater than aproximately one-fourth of a second, this switching circuit immediately effects release of the link regardless of the extent of progress of the call and regardless of whether or not the connection has been released at the called substation. Thus, normalizing of the +B switching circuit 201 will effect release of the link 12 upon abandonment of the call which the link is assigned to handle at any point in the process of setting up the desired connection, as for example, call abandonment before dialing is started, call abandonment after dialing is partially completed or call abandonment after dialing is completed and before the call is answered at the called substation. It will also be apparent that if the calling subscriber is the first to release the connection, i. e., hang up, the link 12 is immediately released under the control of the +B switching circuit 201 embodied in the finder 12a. However, in such case, the line circuit 16 associated with the called line 32 immediately assumes a setting indicating that the line 32 is calling, with the result that the link 12 is reassigned to the called line under the control of the self-allotting circuit 206 of the finder 12a and the usual dial tone signal is returned to the called subscriber. This signal has the effect of indicating to the called subscriber that the connection has been released at the calling substation and that he should hang up.

DETAILED DESCRIPTION OF THE SYSTEM

Figures 1, 8:
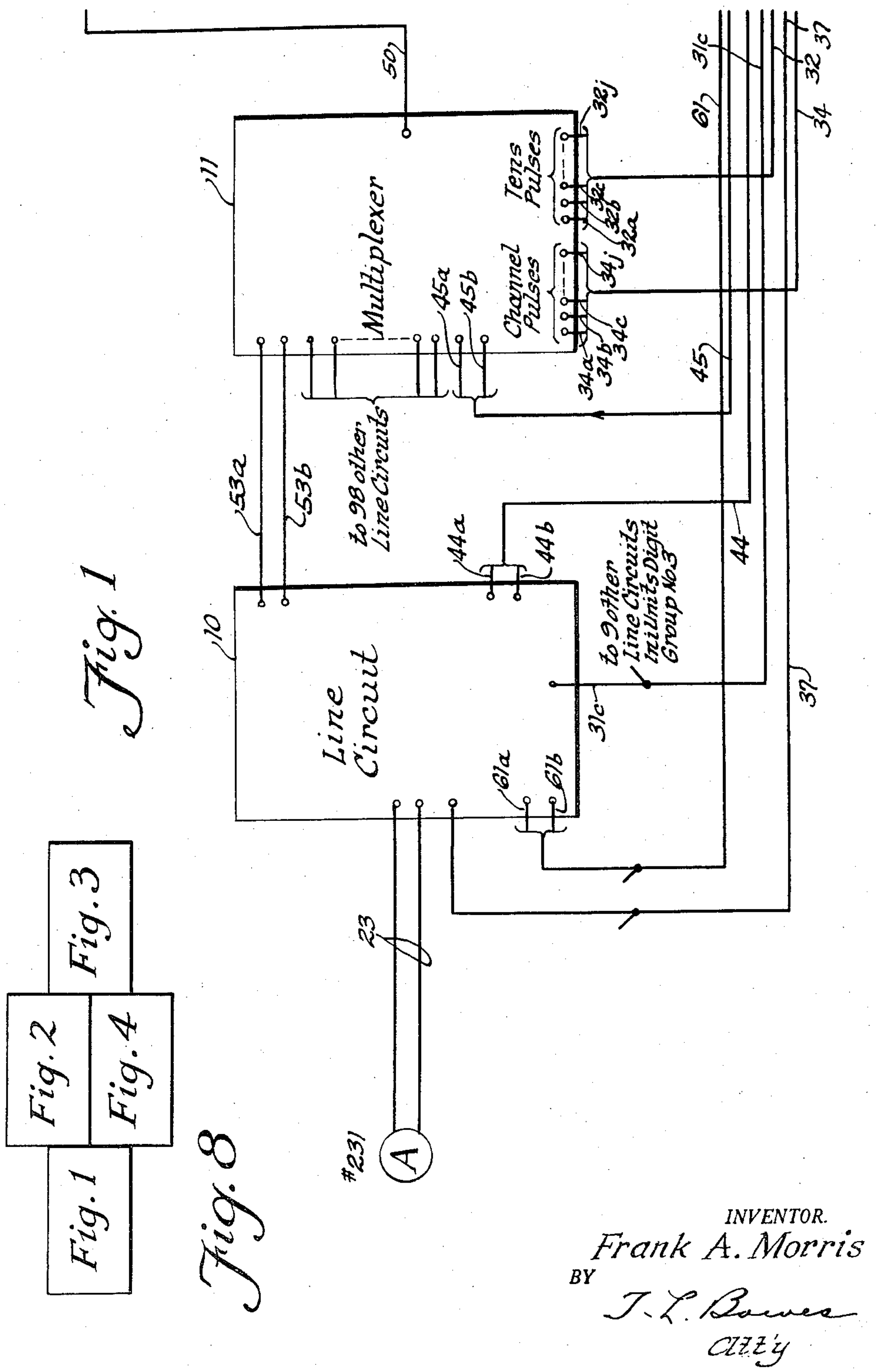

In considering the detailed circuitry of the system components briefly described above, operation of these components will be analyzed in so far as possible in terms of functions which they perform in establishing the above-described connection between the substation A and the substation B in response to the call initiated at the substation A. Before considering the details of the system components, however, it is pointed out generally that corresponding reference characters have been used throughout the drawings to identify corresponding circuit elements of the system. It is also pointed out that all pulse carrying conductors, such, for example, as the signal pulse transmission conductors 50 and 51 are in the form of coaxial cables or transmission lines having low pulse attenuating properties at the pulse frequencies employed. In certain instances, the coaxial cables provided to connect two or more components of the system have been illustrated, but it should also be remembered that all of the other illustrated pulses carrying conductors are of the proper type. On the other hand, all illustrated conductors which function as direct current potential or audio signal carrying conductors are in the form of open or shielded wire.

Throughout the following detailed description of the system, the tube types employed are specifically identified. Moreover, those tubes of the system which are of the gas filled or thyratron type are so identified in the drawings through the use of a small dot within the tube envelope circle and opposite the tube cathode to indicate the gas content of the tube. It is also pointed out that unless necessary to an understanding of the operation of a particular system component, those circuit elements which perform entirely conventional functions in the circuits, namely functions which will be readily understood by those skilled in the art, have not been identified in the drawings or referred to in the following description of the system components.

As used in this specification the terms electronic and electronic means refer to and are intended to define means comprising electron conducting devices, such, for example, as electron tubes, gas tubes, crystal rectifiers, and the like, together with interconnecting circuit components therefor, and to exclude all electromechanical devices embodying moving mechanical parts such, for example, as relays, stepping switches, and the like.

Also, in order to reduce the complexity of this specification those system components which are identical to the corresponding system components of the copending application of Robert B. Trousdale and Frank A. Morris, Serial No. 134,974, filed December 24, 1949, will be only briefly described in this specification, reference being had to the above-identified co-pending application for a complete and detailed description of these system components. However, in order to facilitate an understanding of all of the system components in the party line ringing system of the present system, these components will be discussed in such detail as is necessary to bring out the functions of these units in the present system.

The common equipment 17, except for the link coupling circuits 24, the line circuits 10, 16, etc., the multiplexer 11, the connector 12b, the distributor 15 and the ringing control distributor 15a may all be identical to the corresponding system components shown and described in detail in the co-pending application of Robert B. Trousdale, Serial No. 527,712, identified above and hence a detailed description of these system components is considered unnecessary herein insofar as the present invention is concerned.

*Link coupling circuits 24*

Figure 7:
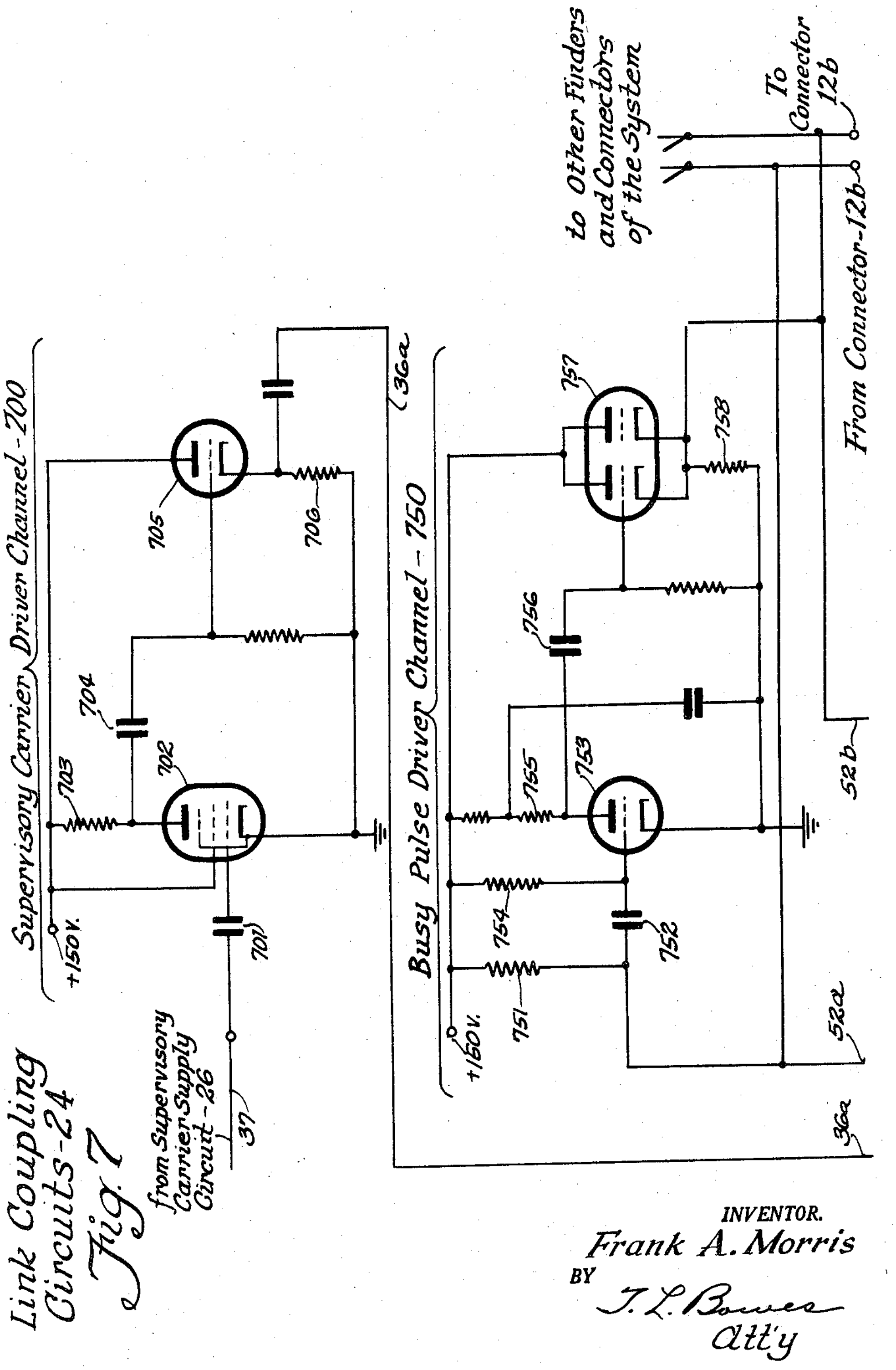
Figure 10:
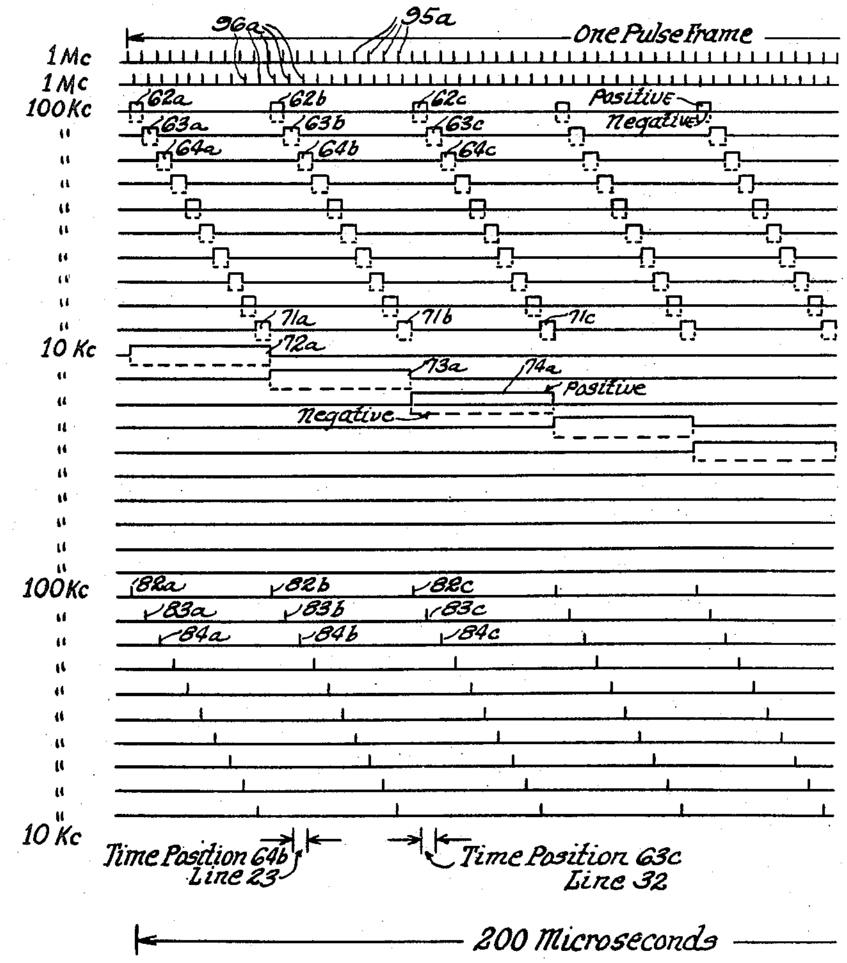
Figure 11:
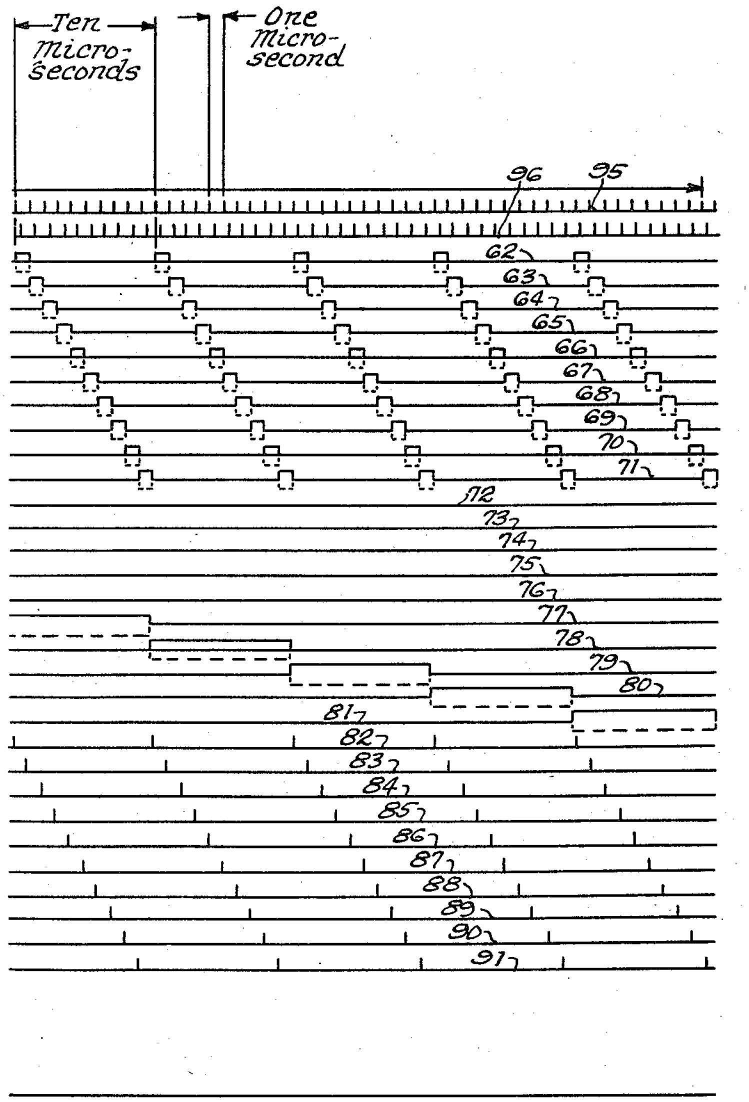
Figure 12:
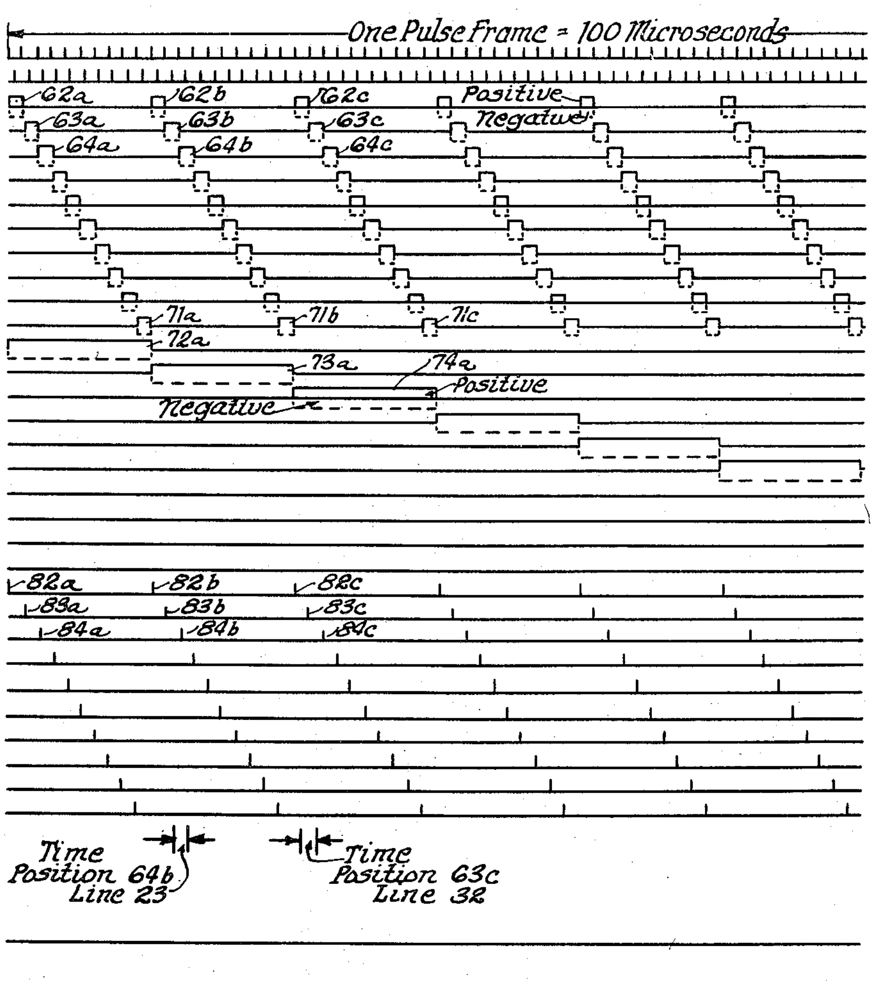
Figure 13:
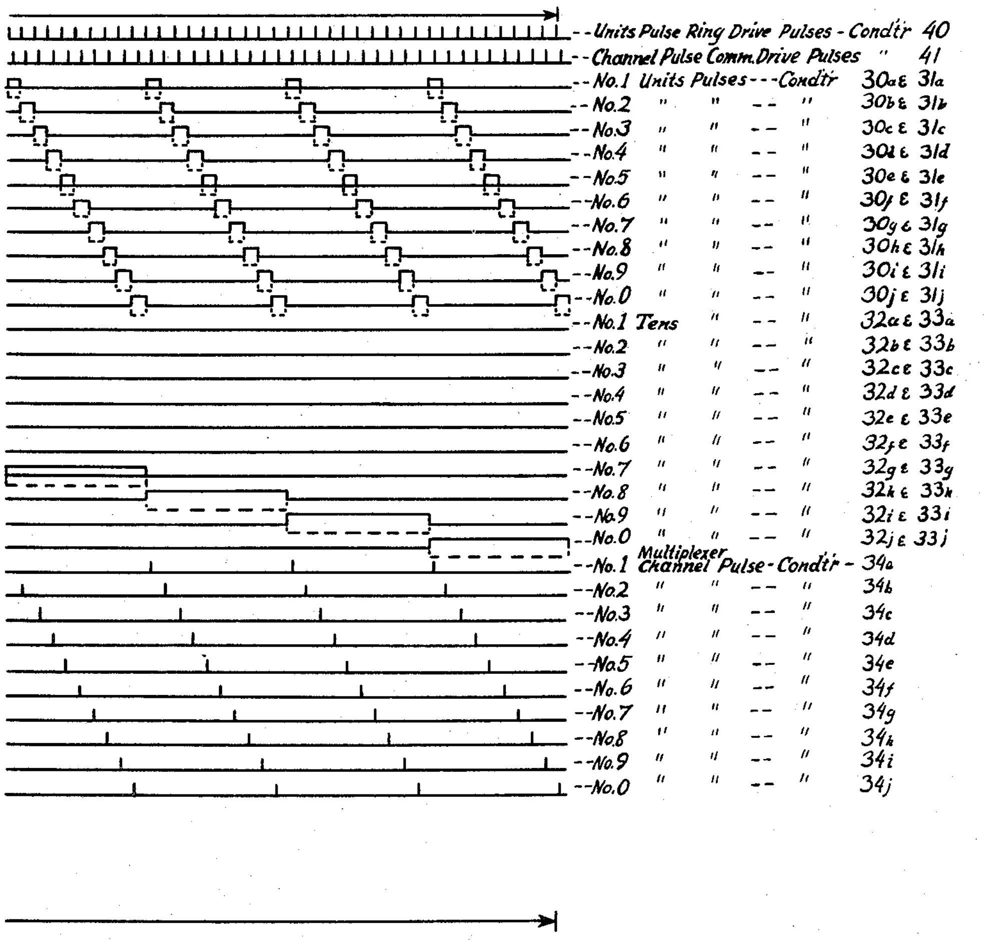
Figure 14:
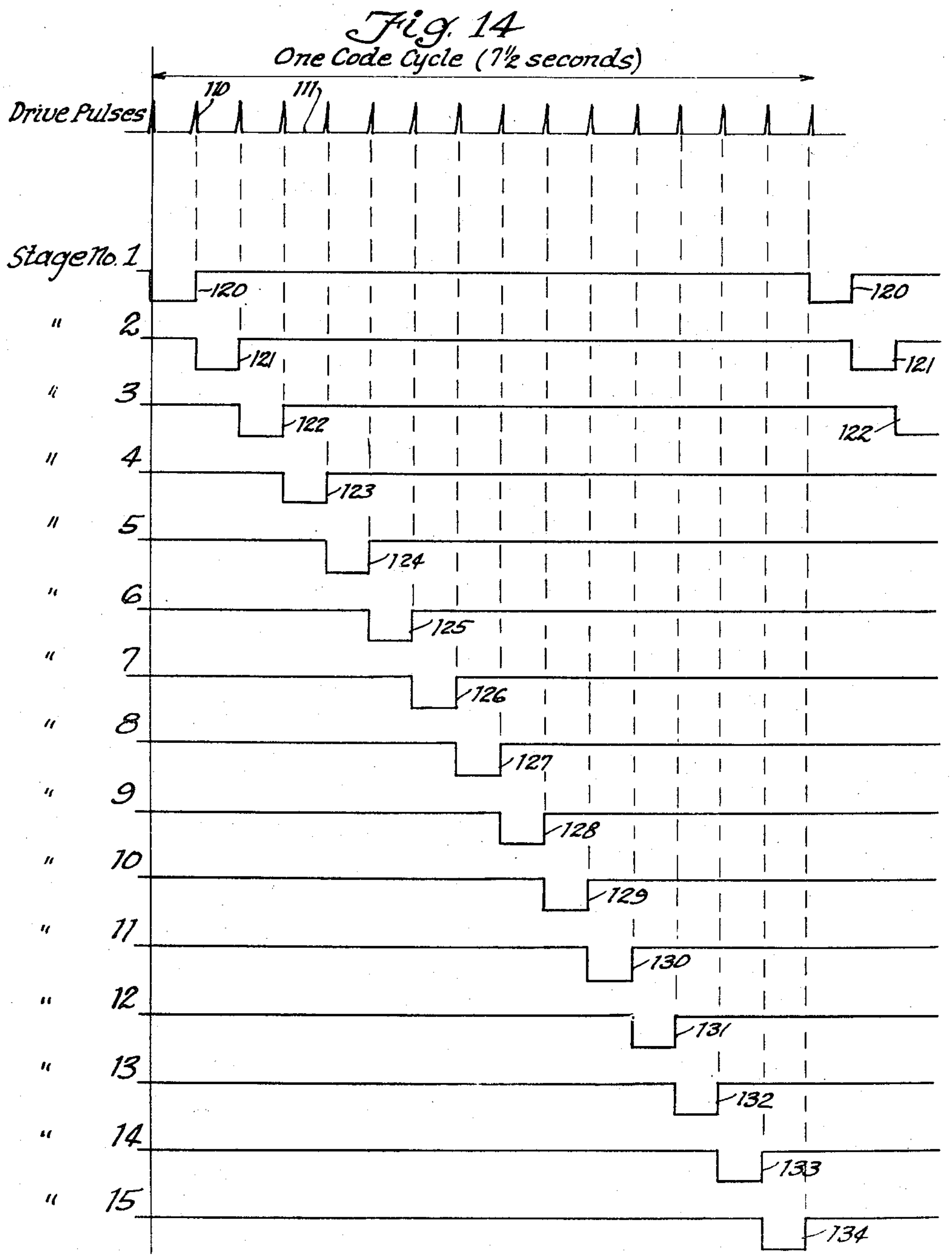
Figure 15:
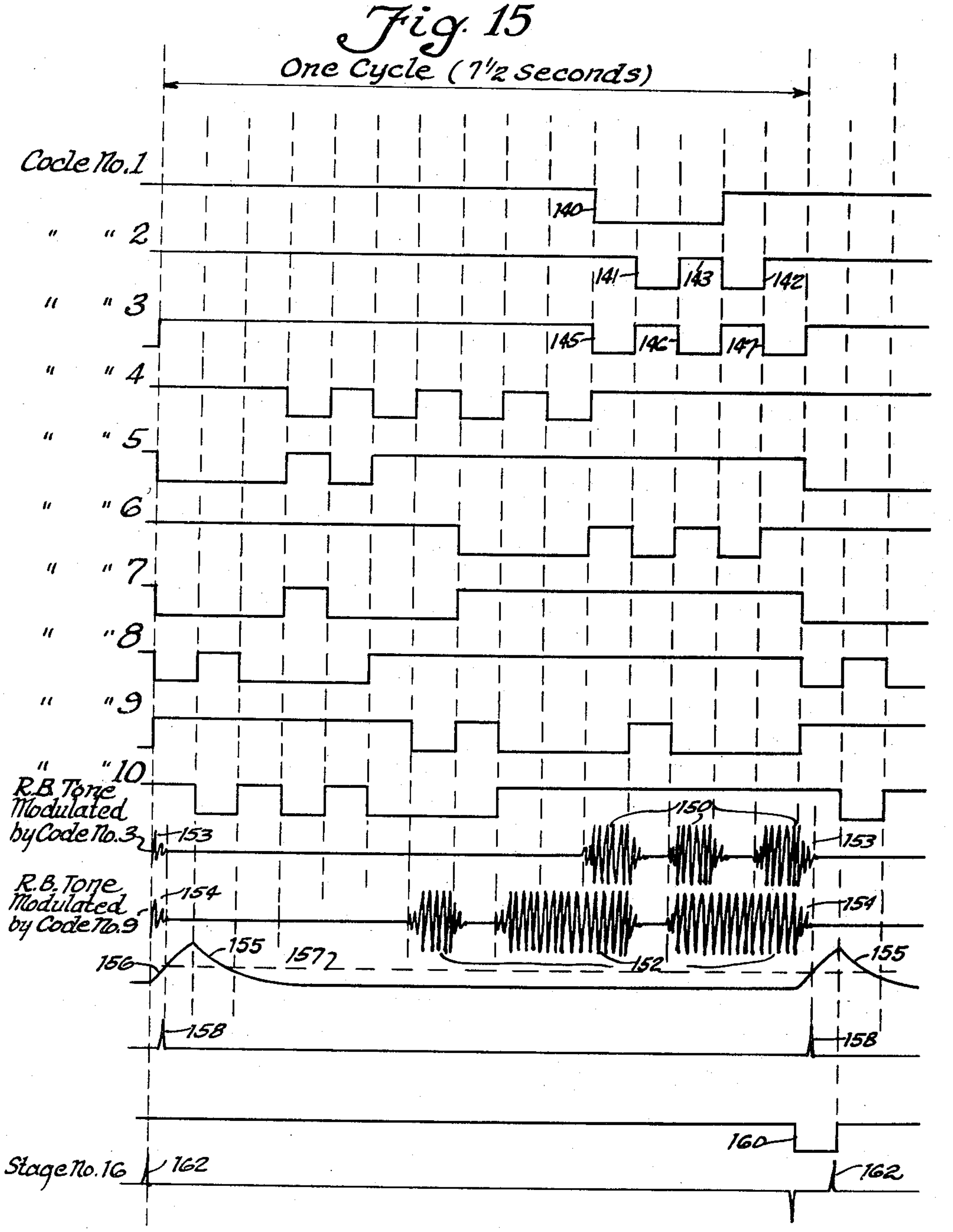

As described briefly in connection with the general description of the system, the link coupling circuits 24, which are shown in detail in Fig. 7 of the drawings, function to provide low impedance output circuits which may be suitably multipled to all of the finders and connectors of the system. More particularly, the circuits 24 include a supervisory carrier driver channel indicated generally at 700 and a busy pulse driver channel indicated generally at 750. The supervisory carrier driver channel 700 receives a supervisory carrier sine wave having a frequency of 100 kilocycles from the supervisory carrier supply circuit 26 over the conductor 37, amplifies the supervisory carrier to a suitable voltage level and supplied the amplified supervisory carrier from a low impedance driving circuit over the conductor 36a to the self-allotting circuit 206 of the first finder 12a of the system. In the finder 12a the supervisory carrier voltage is utilized to self-allot the finder 12a to the first incoming call of the system and after the +B switching circuit 201 thereof is operated the supervisory carrier voltage is diverted over the conductor 36b to the next finder 13a of the system to permit a similar self-allotment of this finder to the next incoming call of the system.

The supervisory carrier voltage from the circuit 26 is supplied over the conductor 37 and through the coupling condenser 701 to the first control grid of an amplifier tube 702, preferably of the commercial type 6A1C5, the cathode of the tube 702 being connected to ground. The supervisory carrier voltage is amplified in the tube 702 and is repeated across the anode resistor 703 thereof at a suitable voltage level for application to the self-allotting circuits of the finders of the system. The amplified supervisory carrier voltage is coupled through the condenser 704 to the control grid of a cathode follower tube 705, preferably of the commercial type 6C4, and is repeated in like phase across the cathode resistor 706 of the tube 705. Inasmuch as the catthode follower 705 has a relatively low output impedance, as will be well understood by those skilled in the art, the voltage produced across the resistor 706 is suitable for application to one or more of the finders of the system without diminution of the amplitude level thereof. In this connection it will be understood that when several calls are being simultaneously handled by the system, the supervisory carrier voltage is diverted through several of the self-allotting circuits of these finders so that a substantial load is placed upon the supervisory carrier voltage source.

As discussed briefly in the general description of the system, the transmission of line busy conditions in the system of the present invention is accomplished by impressing busy pulses upon the common busy pulse out conductor 52*a* and supplying these busy pulses over the common busy pulse in conductor 52*b* to all of the finders and connectors of the system. As outlined generally above, when a finder such as the finder 12*a*, is seized by a calling one of the lines of the system, a busy pulse appearing in the pulse time position of the calling line is impressed upon the common busy pulse out conductor 52*a*. The conductor 52*a* is multipled to all of the other finders of the system and all of the connectors of the system. Consequently, the load conditions on the busy pulse out conductor 52*a* are extremely severe when so many separate units are multipled to this common conductor and considerable power is needed to produce busy pulses of sufficient height properly to actuate the busy test circuits in the connectors of the system.

In a similar manner, the busy pulses produced in the pulse time positions of calling or called lines are multipled to all of the finders and connectors of the system over the busy pulse in conductor 52*b*. The load conditions on the busy pulse in conductor 52*b* are likewise quite severe due to the fact that as many as twenty units may be multipled to this conductor so that considerable power is required to produce pulses of sufficient height thereon.

Accordingly, there is provided in the link coupling circuits 24 a busy pulse driver channel 750 which repeats the busy pulses supplied thereto across a sufficiently low output impedance to drive all of the finders and connectors of the system. More specifically, the busy pulse gate tubes of all of the finders and connectors of the system are provided with a common anode resistor 751 so that busy pulses produced in the pulse time positions of the calling and called lines of the system are all produced across the common anode resistor 751. These busy pulses are repeated through the condenser 752 to the control grid of a triode amplifier tube 753, preferably of the commercial 6J6 type, the control grid of the tube 753 being connected through the grid leak resistor 754 to the positive supply potential. The busy pulses produced across the common anode resistor 751 are of negative polarity and are inverted in the tube 753 so as to appear across the anode resistor 755 thereof as positive pulses of suitable amplitude for actuating the busy circuits of all of the finders and connectors of the system. The positive busy pulses are coupled through the condenser 756 to the control grid of a double triode cathode follower output stage 757. In the illustrated embodiment the cathode follower output tube 757 is of the double triode variety, preferably of the commercial type 6J6, the control grids, cathodes, and anodes of the two sections of this tube being parallel to provide a low output impedance across the cathode output resistor 758 thereof. Accordingly, the positive busy pulses are repeated across the output resistor 758 and a suitable low impedance source is provided for supplying the busy pulses over the busy pulse in conductor 52*b* to all of the finders and connectors of the system.

With the above-described arrangement the busy pulse transmission of the system is segregated into a busy pulse in channel and a busy pulse out channel so that the relatively weak busy pulses produced by the finders and connectors of the system may be amplified and repeated across a relatively low impedance source which is suitable for driving all of the required circuits in the finders and connectors of the system. By segregating the transmission of busy pulses on a busy pulse in and busy pulse out basis as described above, it is possible to provide relatively large amplitude busy pulses in a simple and economical manner. Because the busy pulses do not carry modulation they do not require the same accuracy of wave form as do the other pulses of the system, and a lower grade transmission system may be employed with the result that an ordinary open conductor may be employed in most instances for the transmission of busy pulses throughout the system.

*Finder 12a*

Figure 2:
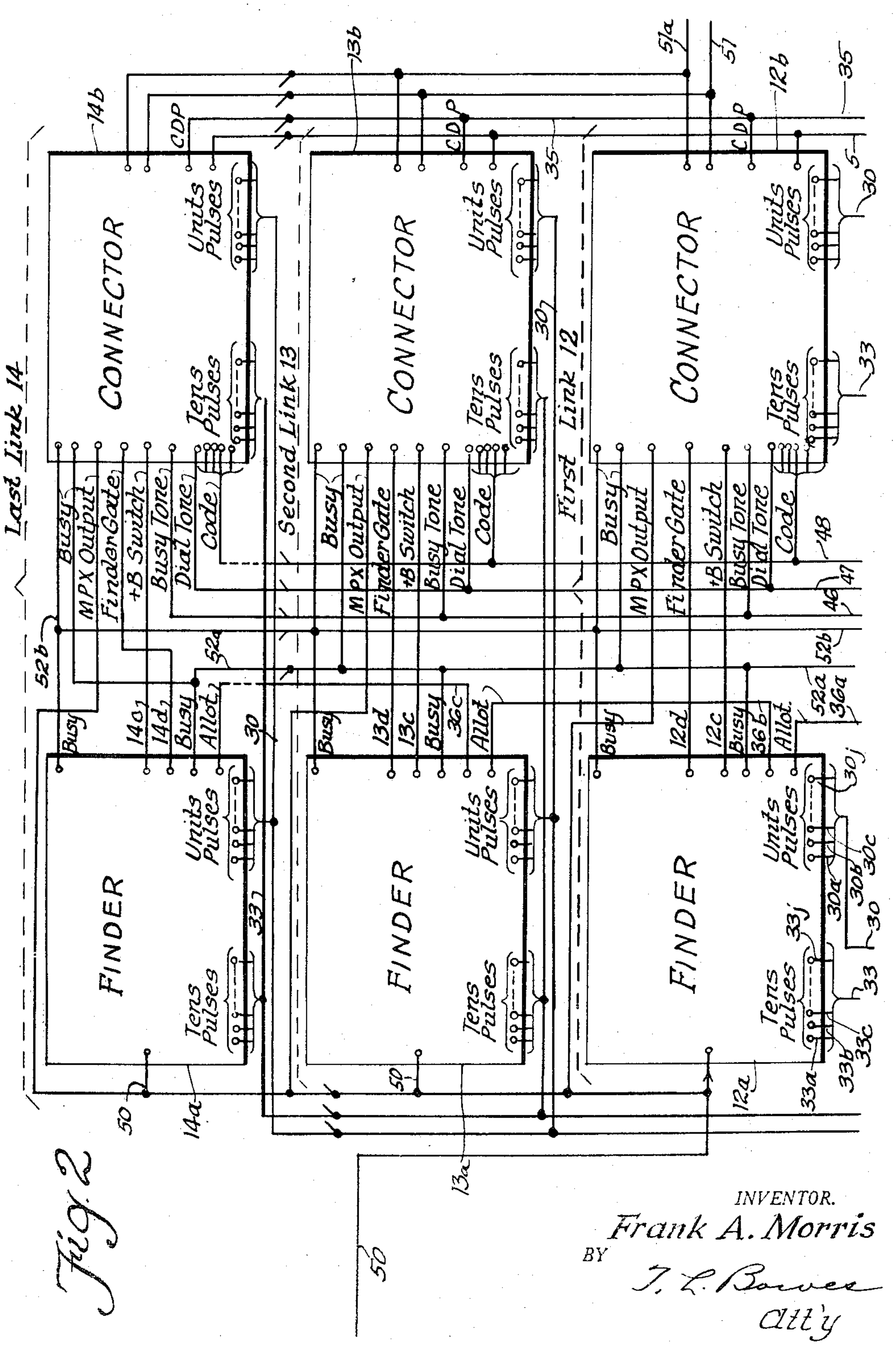
Figure 2A:
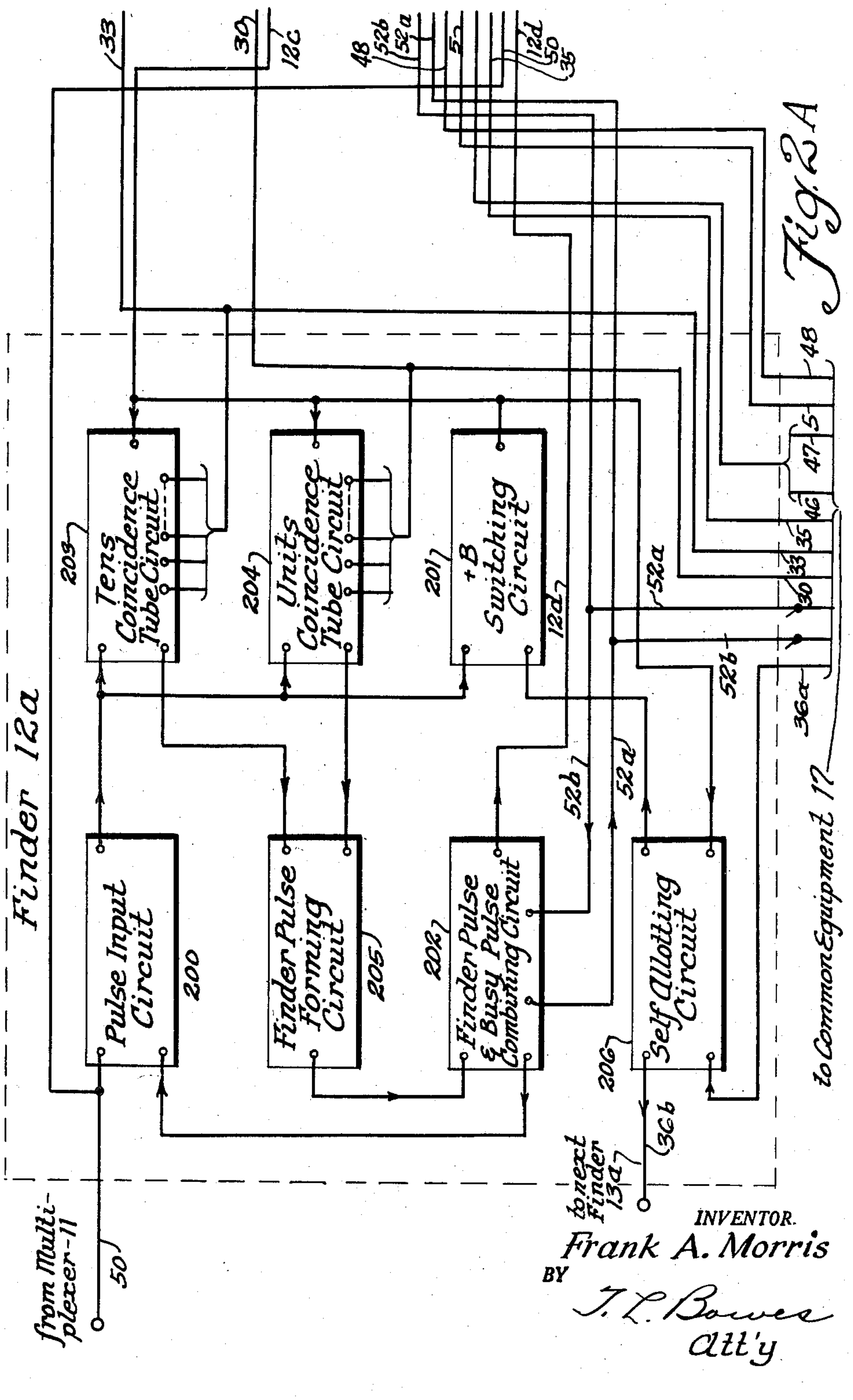
Figure 2B:
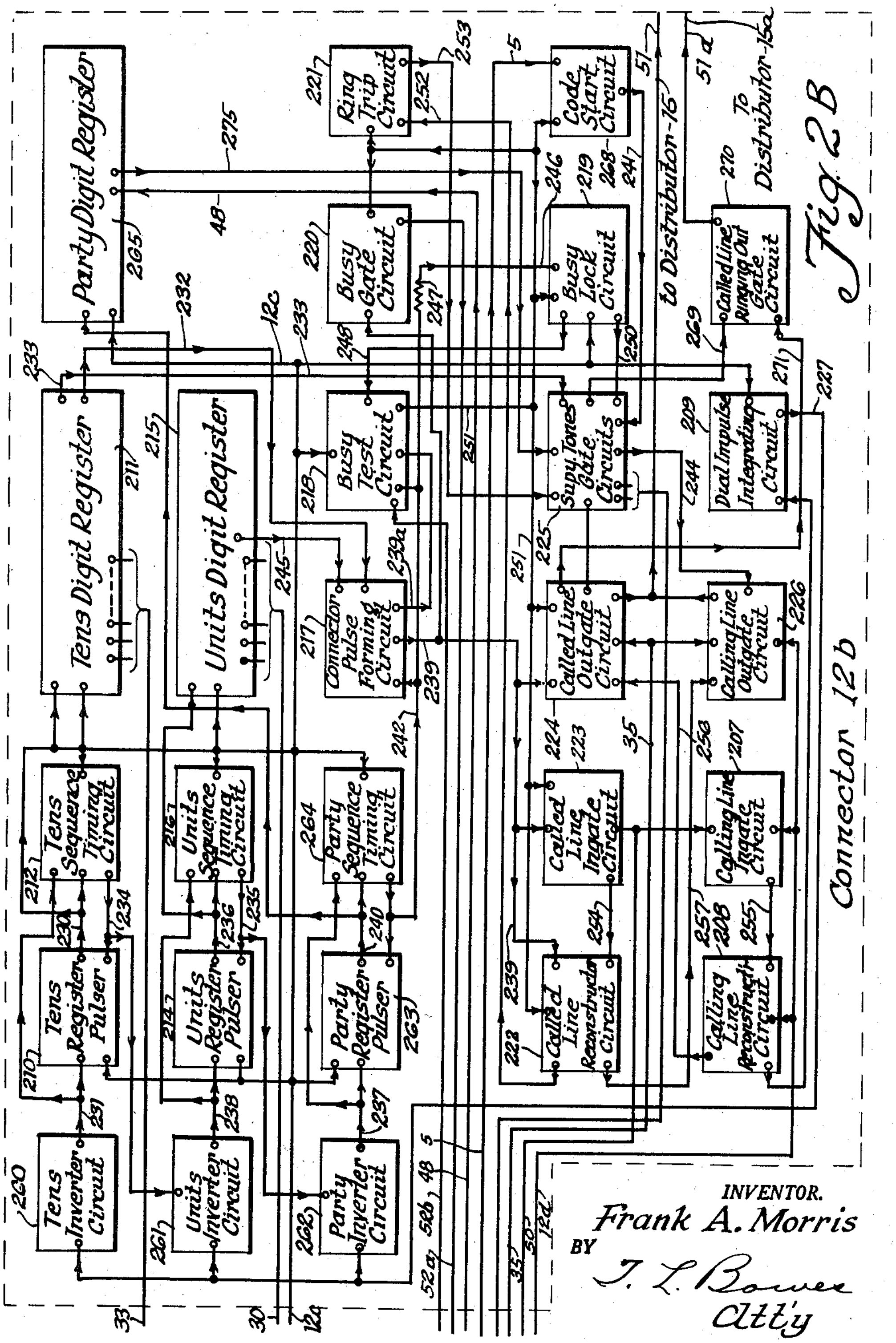
Figures 3, 9:
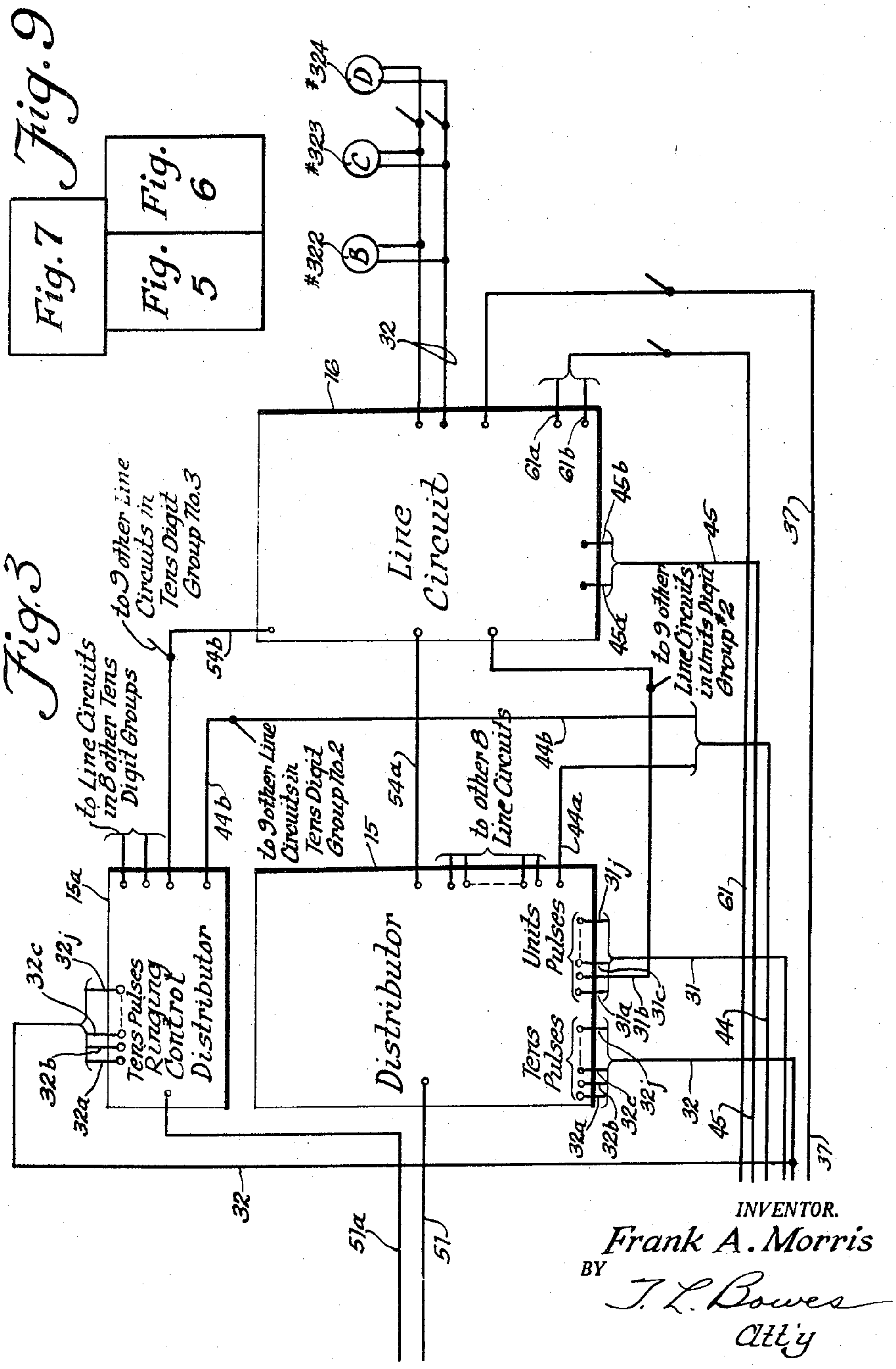
Figure 4:
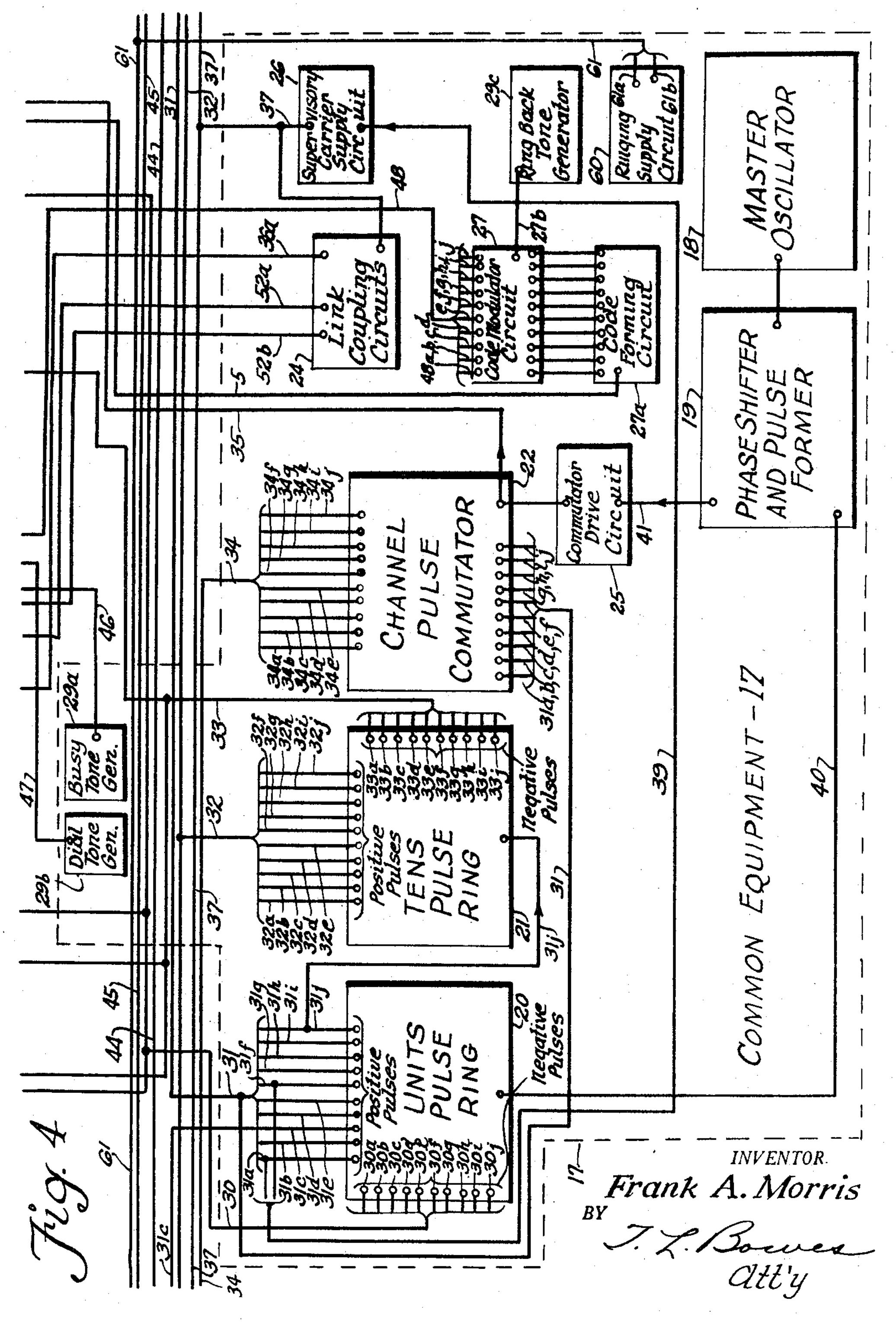

As previously explained in connection with Fig. 2A of the drawings, this finder generally comprises a pulse input circuit 200, a +B switching circuit 201, a finder pulse and busy pulse combining circuit 202, a tens coincidence tube circuit 203, a units coincidence tube circuit 204, a finder pulse forming circuit 205, and a self-allotting circuit 206. The functions performed by this circuit and the identified components thereof are also generally explained above with reference to the same figure of the drawings.

Figure 5:
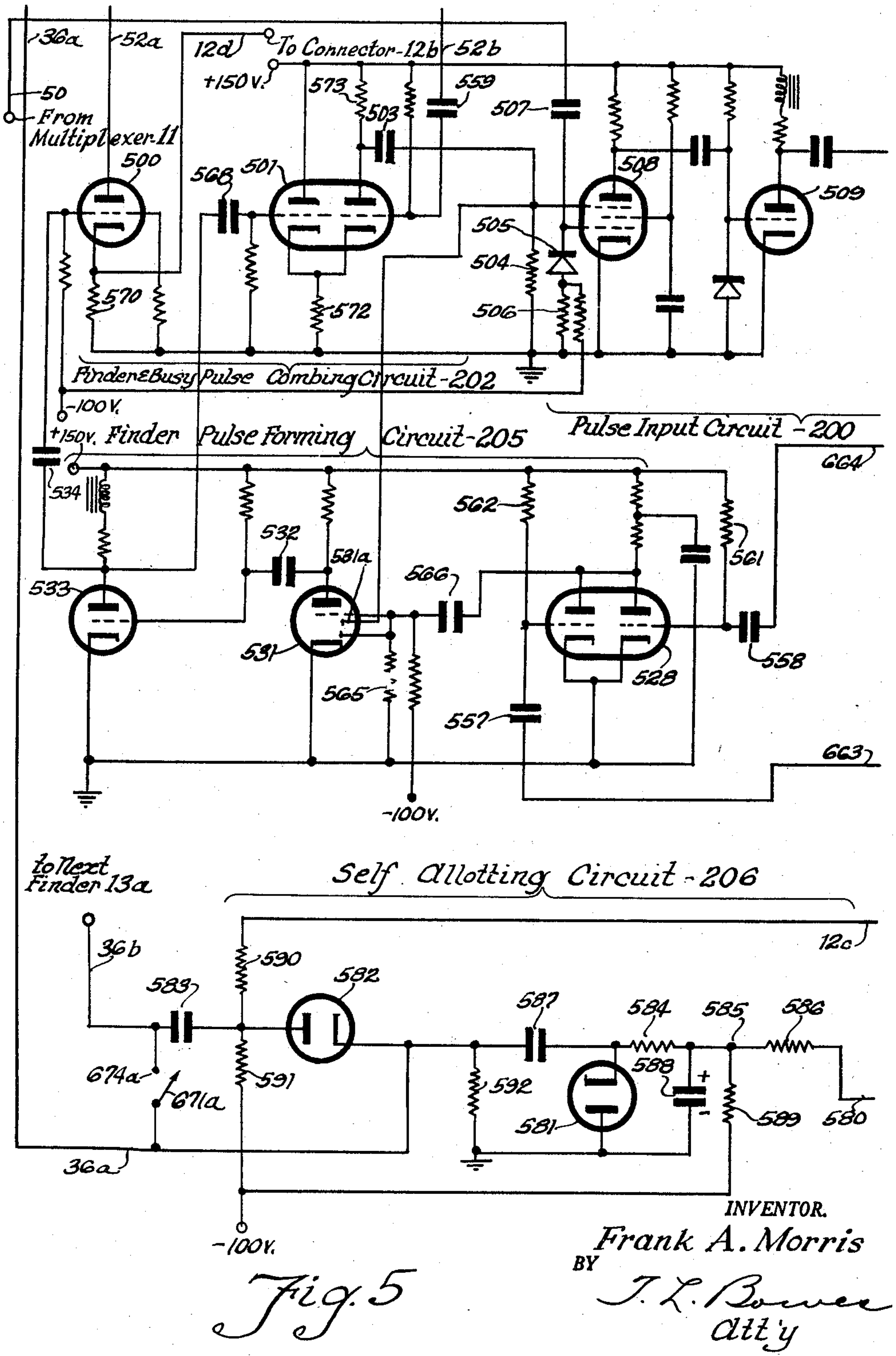
Figure 6:
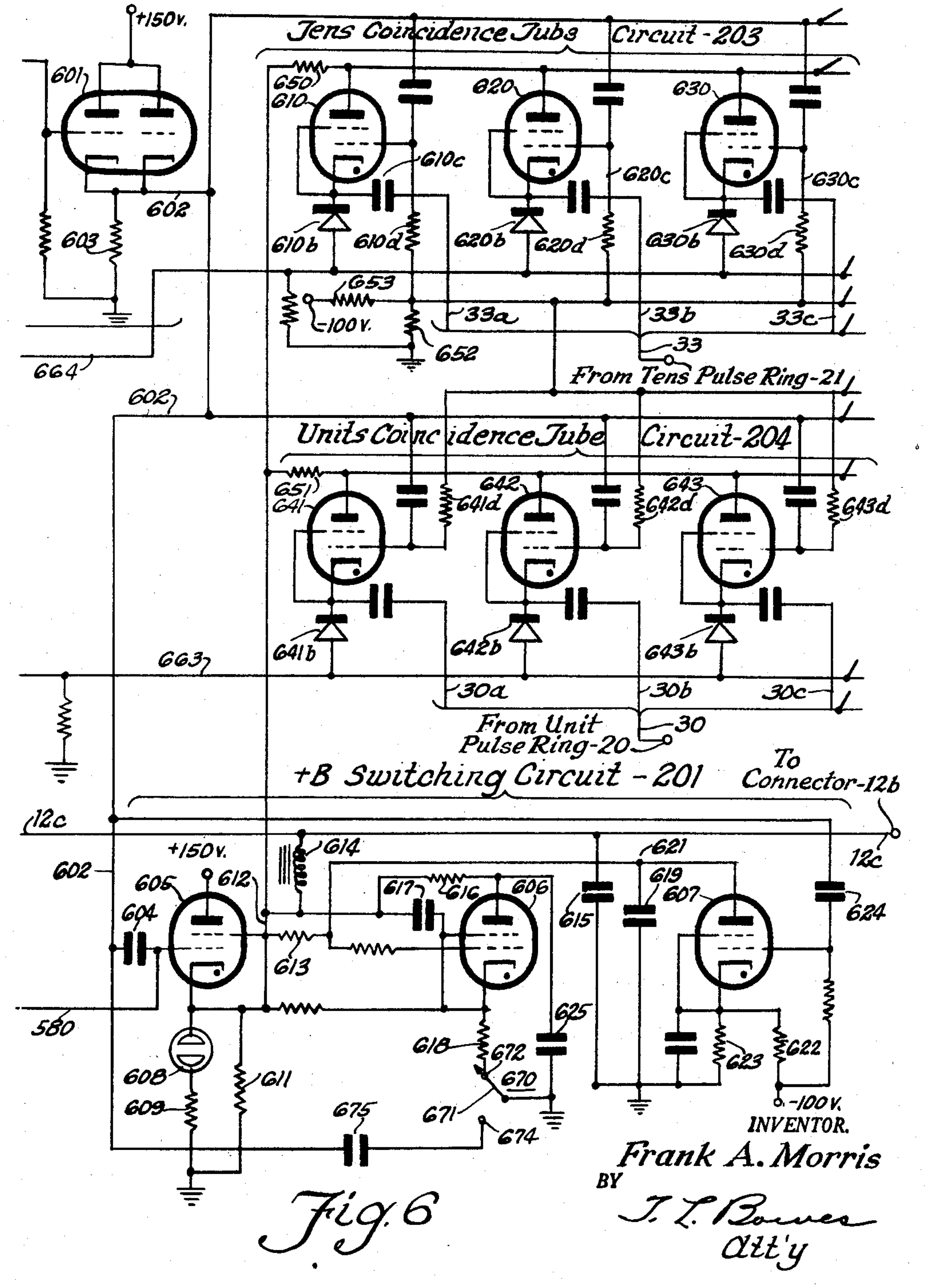

Referring now more particularly to Figs. 5 and 6 of the drawings wherein the detailed circuitry of the finder 12*a* is illustrated, it will be seen that the pulse input circuit 200 comprises a finder control gate tube 508, an inverter tube 509, and a cathode follower tube 601 connected in tandem in the order named and arranged to impress pulses gated therethrough upon a common conductor 602. These pulses are distributed over the conductor 602 to the input terminals of the tens coincidence tube circuit 203, the units coincidence tube circuit 204, and the +B switching circuit 201 in parallel. The self-allotting circuit 206 comprises a bias control tube 581 and an allotter gate tube 582 which are interconnected in the manner shown. This circuit is controlled by the 100 kilocycle supervisory carrier voltage supplied over the conductor 36*a* from the link coupling circuits 24 in the common equipment 17 and produces an enabling bias potential which is supplied over the conductor 580 to the +B switch tube 605. The allotter gate tube 582 is coupled over a path which includes the condenser 583 and the conductor 36*b* to the next succeeding finder 13*a* of the system to divert the 100 kilocycle supervisory carrier voltage to the next succeeding finder 13*a* when the finder 12*a* is taken into use in a manner to be described in more detail hereinafter. The +B switching circuit 201 comprises a +B switch tube 605, a +B switch timing tube 607 and a +B switch extinguishing tube 606 interconnected in the manner illustrated. This circuit is actuated under the joint control of pulses gated thereto from the pulse input circuit 200 over the conductor 602 and an enabling bias potential produced in the self-allotting circuit 206 and supplied over the conductor 580 to the control grid of the +B switch tube 605.

The tens coincidence tube circuit 203 comprises ten gate control tubes, the first, second, and third of which are indicated at 610, 620, and 630 in horizontal alignment in Fig. 6 of the drawings. These gate control tubes have individually associated therewith ten pulse gating rectifiers including the rectifiers 610*b*, 620*b*, and 630*b* and are arranged to be jointly controlled by pulses delivered thereto from the pulse input circuit 200 over the conductor 602 and negative tens pulses successively transmitted thereto over the negative tens pulse conductors 33*a*, 33*b*, 33*c*, etc., from the tens pulse ring circuit 21. The pulses gated by the tens coincidence tube circuit 203 are impressed upon the finder pulse forming circuit 205 over a path which includes the conductor 664 and the condenser 558. Similarly, the units tube coincidence circuit 204 comprises ten gate control tubes of which the first, second, and third tubes 641, 642 and 643 are illustrated in horizontal alignment in Fig. 6. These tubes have pulse gating crystal rectifiers 641*b*, 642*b*, 643*b*, etc., individually interconnected therewith and are arranged to be jointly controlled by pulses delivered thereto over the conductor 602 from the pulse input circuit 200, and negative units pulses successively transmitted thereto over the units pulse conductors 30*a*, 30*b*, 30*c*, etc., from the units pulse ring circuit 20. Pulses gated by the units coincidence tube circuit 204 are transmitted to the finder pulse forming circuit 205 over a path which includes the conductor 663 and the condenser 557.

The finder pulse forming circuit 205 comprises a pulse forming tube 528, a pulse clipping tube 531, and a pulse inverter tube 533 connected in tandem in the order named. As shown, the pulse forming circuit 205 is controlled solely by pulses gated thereto from the two coincidence tube circuits 203 and 204. Pulses developed at the output side of this circuit are impressed upon the pulse combining circuit 202 over two paths which respectively comprise the coupling condensers 534 and 568.

The pulse combining circuit 202 comprises a busy pulse and finder gate pulse output tube 500 and a pulse mixer tube 501, both of which tubes are arranged to be controlled by the finder pulse forming circuit 205. The tube 501 is also arranged to respond to busy pulses transmitted thereto over the busy pulse in conductor 52*b* from the link coupling circuits 24. This circuit functions to gate busy pulses over the busy pulse out conductor 52*a*, when the finder 12*a* is operatively associated with a calling line, to the link coupling circuits 24 in the common equipment 17 wherein these busy pulses are repeated across a low impedance source and supplied over the common busy pulse in conductor 52*b* to all of the finders and connectors of the system. The circuit 202 also functions to gate finder gate pulses to the conductor 12*d* when the finder 12*a* is operatively associated with a calling line. Circuit elements not specifically mentioned in the above description of the finder 12*a* are referred to below in describing the functions which they respectively perform in the finder circuit. All gas-filled tubes embodied in the finder 12*a*, namely the ten tubes of the tens coincidence tube circuit 203, the ten tubes of the units coincidence tube circuit 204, and the three tubes of the +B switching circuit 201 are highly sensitive thyratrons, preferably of the RCA commercial type 5696. The three dual triode tubes 501, 601 and 528 embodied in the finder are preferably of the commercial 6J6 type. The triodes 500, 509, and 533 are preferably of the 6C4 type, the pentode 508 is preferably of the 6AS6 type, the pulse clipping triode 531 is preferably of the 6AQ6 type, and the rectifiers 581 and 582 together comprise a double diode rectifier of the commercial 6AL5 type.

In considering the operational details of the finder 12*a* it is first pointed out that when the finder is idle all tubes embodied in the circuits 203, 204 and 201 are deionized. With these circuits thus rendered inactive the pulse forming circuit 205 and pulse combining circuit 202 are likewise maintained in an inactive condition. Moreover, with the +B switching circuit 201 inactive the associated connector 12*b* is likewise inactive.

In the system of the present invention the finders 12*a*, 13*a*, and 14*a* of the system are arranged in a predetermined numerical order and are successively allotted to successive incoming calls under the control of the self-allotting circuit 206 included in each of the finders. In the illustrated embodiment the finder 12*a* is the first finder in the series and the finder 12*a* is normally continuously enabled by means of a 100 kilocycle carrier voltage which is supplied to the self-allotting circuit 206 of this finder over the conductor 36*a* to permit the finder 12*a* to respond to the first call placed on the system. However, the other finders of the system are disabled under the control of the self-allotting circuits thereof pending seizure of the finder 12*a* by the first calling line. When the finder 12*a* becomes operatively associated with the first calling line the self-allotting circuit 206 thereof operates to divert the 100 kilocycle carrier voltage over the conductor 36*b* to the self-allotting circuit of the succeeding finder 13*a* thereby enabling the finder 13*a* to accept the next call placed on the system. In an entirely similar manner, when the second finder 13*a* becomes operatively associated with the second call the 100 kilocycle carrier voltage is diverted over the conductor 36*c* to the next succeeding finder of the system so that successive links are enabled to handle successive calls placed on the system.

Considering now the details of the self-allotting circuit 206 of the finder 12*a*, the bias control rectifier 581 is normally conductive so as to produce current flow through the series connected resistors 584 and 589 from the negative terminal of the bias potential source. Accordingly, the voltage of the bias potential source is divided between the resistors 584 and 589 so that the junction point 585 thereof is substantially negative with respect to ground. The negative potential at the point 585 is impressed upon the control grid of the +B switch tube 605 over a path which includes the resistor 586 and the conductor 580 to prevent the tube 605 from firing even though gated positive multiplexer pulses are produced on the conductor 602 by the pulse input circuit 200 in a manner to be described in more detail hereinafter. Accordingly, so long as 100 kilocycle carrier voltage is not impressed upon the bias control rectifier 581 in the self-allotting circuit 206, the +B switching circuit 201 is disabled so as to prevent the link from being operatively associated with a calling line of the system. Accordingly, all of the finders except the first finder 12*a* are continuously disabled by means of the self-allotting circuits included therein. However, in the first finder 12*a* the 100 kilocycle supervisory carrier voltage is continuously impressed upon the self-allotting circuit 206 thereof over the conductor 36*a* and is coupled over the condenser 587 to the cathode of the bias rectifier 581. During the negative half cycles of the 100 kilocycle carrier voltage the rectifier 581 rectifies this voltage to produce across the condenser 588 a positive voltage with respect to ground which decreases the negative bias potential impressed upon the control grid of the +B switch tube 605 over the conductor 580 to such a value that the tube 605 is fired in response to positive multiplexer pulses gated to the conductor 602 through the pulse input circuit 200. It will be understood that in the other finders of the system no 100 kilocycle supervisory carrier voltage is supplied to the bias control rectifiers in the self-allotting circuits thereof so that the +B switching circuits of the finders are continuously disabled and these links are prevented from becoming operatively associated with the calling lines of the system.

When gated positive multiplexer pulses are impressed upon the conductor 602 by the pulse input circuit 200 in the finder 12*a*, the +B switch tube 605 in the circuit 201 is fired to provide a +B switch potential on the conductor 12*c* in a manner to be described in more detail hereinafter. Accordingly, the +B switch potential impressed upon the conductor 12*c* energizes the controlled components in the connector 12*b* so that the link 12 becomes operatively associated with the first calling line of the system in the manner described generally above in connection with the general description of the system.

In the self-allotting circuit 206 of the finder 12*a* the allotter gate tube 582 is normally biased non-conductive to prevent the transmission of the 100 kilocycle carrier voltage from the input conductor 36*a* to the output conductor 36*b* associated with the finder 12*a*. Thus, the cathode of the allotter gate tube 582 is connected through the resistor 592 to ground and the anode thereof is connected to a negative potential on the voltage divider network comprising the resistors 590 and 591 which are connected between the +B switch conductor 12c and the negative bias potential source. Since the potential on the conductor 12c is equal to zero, until the +B switching circuit 201 is operated, it is obvious that the anode of the allotter gate tube 582 is operated at a negative potential with respect to the cathode potential thereof so that the tube 582 is normally blocked. However, when the link 12 becomes operatively associated with the first calling line of the system and the +B switching circuit 201 operates to impress a +B switch potential of approximately 140 volts upon the +B switch conductor 12c, the anode potential of the allotter gate tube 582 is increased sufficiently to permit the tube 582 to conduct. When the allotter gate tube 582 is rendered conductive in the manner described above, the 100 kilocycle carrier voltage which is continuously impressed upon the conductor 36a is diverted to the next succeeding finder 13a over a path which includes the allotter gate tube 582, the condenser 583, and the conductor 36b. In the finder 13a the 100 kilocycle carrier voltage impressed upon the conductor 36b reduces the bias potential normally produced by the self-allotting circuit thereof to permit the +B switching circuit of the finder 13a to respond to gated multiplexer pulses impressed thereon by the pulse input circuit thereof in the time position of the next calling line of the system. From the foregoing description it will be evident that the self-allotting circuits 206 of the successive finders of the system are effectively connected in series by means of the illustrated conductors 36a, 36b, 36c, etc., and the allotter gate tubes thereof are successively unblocked in response to seizure of the link to enable successive ones of the links to handle successive incoming calls of the system. If one of the first few links becomes available for use while a higher numbered link is in use, the allotter gate tube in the lower numbered link is closed so that none of the higher numbered links are available. However, any seized link is unaffected by removal of 100 kilocycle carrier voltage therefrom after it is seized since the +B switch tube thereof, once fired, may only be extinguished by the associated +B switch extinguishing tube. The seized link is, however, disabled when released.

Operational details of the other components of the finder 12a may best be explained with reference to the functions performed by this finder in handling the above-described call originating at the substation A and routed to the substation B. In this regard it will be recalled from the above general description of the system that when the call is initiated on the line 23 serving the substation A, multiplexer pulses appearing in the time position 64b assigned to the calling line 23 and modulated with signals derived from this line are transmitted from the multiplexer 11 over the multiplexer output conductor 50 to each of the finders and connectors of the system. However, as described immediately above, none of the finders of the system except the finder 12a is permitted to respond to such multiplexer pulse transmission over the conductor 50 due to the operation of the self-allotting circuit therein so that only the link 12 is permitted to be operatively associated with the calling line. In this connection it will be understood that unless a 100 kilocycle supervisory carrier voltage is supplied to one of the finders of the system, all finders are rendered inoperative and the system is completely unable to handle calls. However, in the illustrated embodiment the 100 kilocycle supervisory carrier voltage is continuously supplied to the first finder 12a so as to permit this finder to handle the first call of the system.

The positive multiplexer pulses occurring on the conductor 50 in the time position 64b assigned to the calling line 23 are coupled through the condenser 507 to the first control grid of the gate tube 508. This control grid is normally biased beyond cutoff by means of the negative potential produced across the resistor 506 so that normally no current flows through the tube 508. However, the positive multiplexer pulses appearing on the conductor 50 overcome the negative bias normally applied to this control grid and are amplified and inverted through the tube 508 to appear as negative pulses at the anode thereof. These negative gated multiplexer pulses are again amplified and inverted in the tube 509 and repeated across the output resistor 603 of the cathode follower tube 601 as gated positive multiplexer pulses which are connected over the conductor 602 to the coincidence tube circuits 203 and 204 and the +B switching circuit 201.

The first positive pulse thus produced on the conductor 602 is impressed upon the control grid of the thyratron +B switch tube 605 through the condenser 604 and has the effect of overcoming the negative bias potential produced on the conductor 580 by the self-allotting circuit 206 in the manner described above. In this connection it will be understood that in the absence of a 100 kilocycle carrier voltage supplied to the self-allotting circuit 206 the bias potential on the conductor 580 is sufficiently negative to prevent the positive gated multiplexer pulses on the conductor 602 from firing the tube 523. However, in the finder 12a the bias potential on the conductor 580 is just sufficiently negative normally to bias the tube 605 non-conductive and the first positive pulse produced on the conductor 602 overcomes this bias and fires the tube 605 to produce current flow through the cathode load resistor 611 thereof. After the tube 605 fires the grid thereof loses control so that thereafter the presence or absence of pulses on the conductor 602 cannot directly affect the ionized condition of the tube. With the tube 605 conducting the voltage of the 150 volt anode current source less the voltage drop through the tube 605 is impressed upon the conductor 612 and is supplied to the tens and units coincidence tubes circuits 203 and 204. This voltage has a magnitude of the order of 140 volts which is impressed across the neon indicator tube 608 and the resistor 609 to fire this tube and thus provide a visual indication that the finder 12a is in use. The voltage produced on the conductor 612 is impressed upon the +B switching conductor 12c over a path which includes a filter network consisting of a series choke impedance 614 and a shunt condenser 615. Likewise, the potential produced on the conductor 612 is applied to the anodes of the tubes 606 and 607 through the resistors 616 and 613 respectively.

The +B switch potential is applied directly to the anodes of the tens and units coincidence tubes over the conductor 612 instead of being connected through the filter including the inductance 614 and the condenser 615 to these tubes. Accordingly, the delay action which results when the +B switch potential is applied through the inductance 614 is substantially eliminated and firing of the coincidence tubes in the circuits 203 and 204 is accelerated. In addition, the above described arrangement for supplying +B switch potential directly to the anodes of the tens and units coincidence tubes provides the additional advantage of improving the regulation of the plate potential for these tubes with the result that the operation of the tens and units coincidence tubes is substantially more uniform. In this connection it will be understood that a great majority of the connector circuits utilize current from the +B switch conductor 12c, and during the progress of a call, draw steadily increasing amounts of current. Since this current is diverted through the choke coil 614, which has appreciable D. C. resistance, the regulation of the +B switch potential is relatively poor.

Normally the tubes of the tens coincidence tube circuit 203 are biased to prevent space current flow therethrough by the negative potentials impressed upon the control grids thereof from the bleeder resistors 652 and 653 through the isolating resistors 610d, 620d, 630d, etc., individual thereto. The tubes of the units coincidence tube circuit are similarly biased against space current flow therethrough by the negative potentials impressed upon the respective control grids thereof through the isolating resistors **641*d*, 642*d*, 643*d*, etc. When operating anode potential is supplied to the anodes of the gate control tubes of the circuits 203 and 204 these tubes are conditioned to fire under the joint control of the negative tens and units pulses respectively delivered to these circuits and the pulses gated to these circuits over the conductor 602 from the pulse input circuit 200**. Accordingly, the pulses delivered in the time position *64b* over the conductor 602 to the control grids of the tubes in the circuits 203 and 204 coact with the tens and units gate pulses which are negatively applied to the cathodes of these tubes to fire that tens coincidence tube which corresponds to the tens time position of the calling line in each pulse frame, and that units coincidence tube which corresponds to the units time position of the calling line 23. Accordingly in the illustrated call, the pulses developed on the conductor 602 in the time position *64b* occur in coincidence only with the second tens pulse of each pulse frame and the third units pulse of each pulse frame so that only the tens coincidence tube 620 is fired in the circuit 203 and only the third units coincidence tube 643 is fired in the circuit 204. Once the tubes 620 and 643 are fired the control grids thereof lose control such that space current flow therethrough continues without interruption so long as the +B switching circuit 201 maintains operating potential upon the anodes thereof. Moreover, once the tube 620 has fired the other tens coincidence tubes are positively prevented from firing due to the voltage drop across the common anode resistor 650 which lowers the anode potential of these tubes to values at which firing of these tubes cannot occur. Similarly, the voltage drop developed across the resistor 651 when the tube 643 fires positively prevents any of the other nine units coincidence tubes in the circuit 204 from firing. In this connection it will be understood that the resistors 650 and 651 positively prevent more than one tube from firing in each of the two coincidence tube circuits 203 and 204 and thus prevent the finder **12*a*** from being associated with more than one calling line.

When the tens coincidence tube 620 and the units coincidence tube 643 are rendered conductive in the manner explained above the pulse gating rectifiers **620*b* and 643*b*, respectively controlled thereby are unbiased to permit pulse transmission therethrough over the conductors 664 and 663, respectively, to the pulse forming circuit 205. In this regard it is noted that the negative pulses impressed upon the cathode of the tube 620 through the condenser 620*c* overcome the control grid bias produced across the common grid resistor 652 and drive the cathode of the tube 620 negatively to reduce the bias potential of this tube. When the amplitude of the negative pulses impressed upon the cathode of the tube 620 exceeds the bias potential of this tube the control grid-cathode section of this tube conducts to clamp the tops of these pulses to the control grid bias potential thereby preventing amplitude variations in the tens pulses gated by the rectifier 620*b*. In a similar manner the control grid-cathode portion of the units coincidence tube 643 clamps the negativemost portions of the units pulses impressed upon the cathode of the tube 643** to the bias potential to prevent amplitude variations therein. It will be understood that the above-described clamping action is provided without the necessity of providing separate clamping rectifiers, thus materially decreasing the complexity and cost of the tens and units coincidence tube circuits.

Referring now more particularly to the manner in which the finder pulse forming circuit 205 responds to the tens and units pulses gated thereto from the circuits 203 and 204, it is pointed out that normally both sections of the tube 528 are heavily conductive by virtue of the positive potentials impressed upon the control grids thereof through the grid current limiting resistors 561 and 562 from the positive terminal of the anode current source. The tens and units pulses gated to the control grids of the tube 528 are of sufficient amplitude to cut off space current flow through the respective sections of this tube. As a consequence, space current flow through both halves of the tube 528 is cut off during the short time interval of the units pulse which occurs during the gated tens pulse. Thus, once during each pulse frame a composite pulse consisting of the units pulse occurring in the time position *64b* and the tens pulse occurring in the tens time position *73a* is developed at the common anode terminal of both halves of the tube 528. These pulses which are developed at the common anode terminal of the tube 528 are of positive polarity and are impressed upon the control grid of the pulse clipping tube 531 through the condenser 566. Normally, the voltage drop across the resistor 565 is negatively applied to the control grid of the tube 531 to bias this grid beyond cutoff by an amount appreciably greater than the amplitude of either of the unwanted units and tens pulses impressed upon this control grid during each pulse frame. However, that portion of each composite pulse which exceeds in amplitude the bias voltage impressed across the resistor 565 is reproduced in amplified form as a negative pulse at the anode of the tube 531. The pulses thus gated by the tube 531 in the time position *64b* are impressed upon the control grid of the pulse inverter tube 533 through the coupling condenser 532. These pulses are repeated at the anode of the tube 533 as positive pulses occurring in the time position *64b* assigned to the calling line 23 and are hereinafter referred to as finder pulses.

The finder pulses developed at the anode of the tube 533 in the manner just explained are impressed upon the control grid of the output tube 500 through the coupling condenser 534. In order to provide finder gate pulses which serve to condition the connector associated therewith to respond only to multiplexer pulses appearing on the multiplexer output conductor in the time position assigned to the calling line 23, which finder gate pulses are substantially isolated from the other signals of the system, the cathode circuit of the tube 500 is used solely as a source of such pulses which are transmitted over the conductor **12*d* as finder gate pulses to the connector 12*b*. Thus, the finder pulses which are impressed upon the control grid of the tube 500 are repeated across the cathode resistor 570 of this tube and are supplied over the finder gate conductor 12*d* to the conductor 12*b*. In this connection it will be understood that the finder gate pulses are used to control the response of the connector 12*b* and if extraneous pulses, such as busy pulses or the like, appear on the conductor 12*d* the connector 12*b* will respond falsely and interfere with the desired call. However, with the above-described arrangement wherein the finder gate pulses are produced in the isolated cathode circuit of the tube 500, the transmission of extraneous signals over the conductor 12*d*** is positively prevented.

As described generally in connection with the general description of the system, the transmission of line busy information in the present system is accomplished by providing separate busy pulse in and busy pulse out conductors which are multipled to all of the finders and connectors of the system, and providing a common busy pulse driver channel in the link coupling circuits 24 which is inserted between the busy pulse out conductor and the busy pulse in conductor to provide busy pulses of sufficient amplitude and at a sufficiently low impedance to drive all of the finders and connectors of the system. Accordingly, in the present system the anode circuit of the output tube 500 is utilized as a busy pulse out circuit and the finder pulses which are repeated at the anode of the tube 500 as negative pulses are transmitted over the busy pulse out conductor 52_a_ to the common anode resistor 751 (Fig. 7) in the link coupling circuits 24. In this connection it will be understood that the finder pulses which are supplied to the control grid of the output tube 500 are of the same time duration and in fact correspond exactly to the units pulses corresponding to the particular pulse time position of the calling line. Accordingly, the finder pulses may be utilized as busy pulses, which are repeated to all of the finders and connectors of the system in the manner described in detail above, and may also be used as finder gate pulses which are transmitted over the conductor 12_d_ to the connector 12_b_ to condition this connector to respond only to multiplexer pulses appearing on the multiplexer output conductor 50 in the time position assigned to the calling line.

Busy pulses which are amplified in the link coupling circuits 24 in the manner described above, are transmitted over the busy pulse in conductor 52_b_ and through the coupling condenser 559 to the right hand control grid of the pulse mixer tube 501 along with any other busy pulses applied to this conductor as a result of other lines of the system being busy. In the absence of the facilities described below, the busy pulses thus impressed upon the right control grid 501 in the time position 64_b_ would have the effect of biasing the suppressor grid of the finder control gate tube 508 to cutoff, thus preventing the desired multiplexer pulses from being gated by this tube. To prevent this action from occurring the left hand section of the tube 501 is supplied with positive finder pulses which are impressed upon the left control grid of the tube 501 directly from the anode of the tube 533 through the coupling condenser 568. These finder pulses have approximately twice the amplitude of the busy pulses coincidentally impressed upon the right control grid of this tube so that heavy space current flow through the left section of the tube 501 and the common cathode resistor 572 occurs during each finder pulse interval. The increase in anode current flow through the left section of the tube 501 during each finder pulse interval has the effect of increasing the bias on the right section of this tube to such an extent that current flow through the anode resistor 573 and the right section of the tube 501 drops to very low value. As a consequence, the voltage drop across the resistor 573 is reduced to a very low value permitting charging current to flow from the positive terminal of the anode current source through this resistor, the condenser 503 and the diode section 531_a_ of the pulse clipping tube 531 to the grounded terminal of the anode current source. Thus, the condenser 503 is charged to a relatively high voltage level during the finder pulse interval. At the end of each such interval the voltage across the condenser 503 is negatively applied to the suppressor grid of the gate tube 508 in opposition to the voltage drop across the right section of the tube 501 and the cathode load resistor 572. The voltage across the condenser 503 predominates sufficiently to bias the suppressor grid of the tube 508 beyond cutoff. Moreover, the described charging action of the condenser 503 occurrs during the time position 64_b_ of each pulse frame. Further, the discharge path for this condenser, which includes the resistor 504, has such a long time constant that the condenser 503 is not appreciably discharged between successive charging intervals. As a consequence, the tube 508 is biased beyond cutoff by the voltage across the condenser 503 throughout each pulse frame except the particular interval spanned by the time position 64_b_ of each pulse frame. During this interval of each pulse frame the right anode of the tube 501 becomes highly positive to overcome the voltage across the condenser 503 and thus lower the bias on the suppressor grid of the tube 508 so that this tube can conduct.

From the preceding explanation it will be understood that pulses from the multiplexer 11 are permitted to enter the finder 12_a_ only during those intervals when finder pulses are developed by the circuit 205 so that the finder control gate tube 508 is responsive only to multiplexer pulses in the time position of the calling line.

Referring now more particularly to the operation of the +B switching circuit 201, it is pointed out above that the +B switching tube 605 is fired under the influence of the pulses gated by the tube 508 in the time position 64_b_ immediately the finder 12_a_ is taken into use to handle the call initiated at the substation A and that when space current flow through this tube is established an operating anode potential of 140 volts appears at the cathode of this tube. After this tube is fired, deionization thereof is under the control of the two associated tubes 606 and 607. More specifically, the extinguishing tube 606 is provided to deionize the tube 605 when the call is abandoned or terminated, while the +B switch timing tube 607 is provided to prevent undesired deionization of the tube 605 during the open circuit periods of dial impulses dialed through operation of the impulsing contacts 2005 at the calling substation, hook switch flashing intervals, and other periods of short duration when the loop circuit extending from the substation A to the line circuit 10 may be interrupted. Normally, i. e., with the circuit 201 inactive, the condenser 619 is completely discharged through the resistors 613 and 611 so that the terminal 621 thereof is at substantially zero potential. Also, with the circuit 201 inactive, the negative 100 volts of the bias potential source is divided between the two resistors 622 and 623 in the ratio of five volts across the resistor 622 and 95 volts across the resistor 623. Thus the cathode of the tube 607 is normally maintained at a potential which is 95 volts negative with respect to ground.

When the +B switch tube 605 fires in the manner explained above, the condenser 625 is charged to the full value of the voltage across the resistor 611 through the resistor 616, and operating anode potential is supplied to the tube 606. Also, the condenser 617 is charged through the cathode resistor 618 to the full value of the voltage across the resistor 611. Charging of the condenser 617 over this path drives the cathode terminal of the resistor 618 highly positive during the initial portion of the charging interval. Concurrently with charging of the condenser 617, a charging path for the condenser 619 is established from the cathode terminal of the resistor 611 through the timing resistor 613. Initially, the major portion of the charging voltage appears across the resistor 613 and a very small portion thereof appears across the condenser 619. Similarly, the major portion of the charging voltage for the condenser 617 initially appears across the cathode resistor 618 immediately after the tube 605 fires. Thus, during the initial portion of the condenser charging interval, the control grid of the tube 607 is held at ground potential whereas the cathode of the tube is driven highly positive. The grid of the tube 606 is thus effectively biased negative relative to the tube cathode by an amount equal to the voltage drop across the resistor 618. This bias prevents the tube 606 from firing.

As explained above, the grid of the tube 607 is normally biased approximately five volts negative relative to the tube cathode by the voltage across the resistor 622. This bias voltage prevents the tube 607 from firing in the absence of positive pulses on the output conductor 602 of the pulse input circuit 200. However, immediately positive pulses are gated to this conductor by the pulse input circuit 200 they are impressed upon the control grid of the tube 607 through the condenser 624 and serve to drive this control grid positive relative to the tube cathode and fire the tube. It will thus be apparent that the tubes 607 and 605 are fired substantially simultaneously. When the tube 607 is fired, current flows through this tube and the condenser 619 in a circuit which extends from the grounded terminal of the resistor 623 through the condenser 619 and the space current path of the tube 607 to the cathode terminal of the resistor 623. Thus, the voltage across the resistor 623 less the voltage drop through the tube 607 is impressed across the condenser 619 immediately the tube 607 fires. As a consequence, the circuit terminal 621 is driven approximately 80 volts negative with respect to ground. The negative potential thus developed at the terminal 621 is directly impressed upon the control grid of the tube 606 to bias this grid highly negative with respect to the cathode of the tube and thus prevent the tube from firing regardless of the voltage across the cathode resistor 618. When the voltage across the condenser 619 rises to approximately 80 volts negative the current flow through the tube 607 drops to the extinction point and is interrupted. The condenser 619 now starts to charge through the resistor 613 to the positive potential of 140 volts across the resistor 611. The charging rate of the condenser 619 is obviously determined by the time constant of the series circuit comprising this condenser and the resistor 613. When the potential of this terminal is reduced to a value of approximately 60 volts negative the voltage across the tube 607 is increased to a value at which this tube refires. When the tube 607 refires the voltage across the condenser 619 instantly arises to a value of 80 volts to again produce deionization of the tube 607. The described relaxation type of operation of the tube 607 and condenser 619 continues so long as an off hook condition persists at the calling substation A.

During the open circuit or break period of each dial impulse the transmission of multiplexer pulses to the finder 12*a* in the time position 64*b* assigned to the calling line 23 is arrested so that the tube 607 cannot refire after it is first extinguished during the initial portion of the dial impulse break period. Due to the long time constant of the condenser discharging circuit the dial impulse break period is not long enough to charge the condenser to a point at which the negative bias on the control grid of the tube 606 becomes insufficient to prevent this tube from firing. When the dial impulse break period ends to cause resumption of the pulse gating operation of the circuit 200 the tube 607 immediately fires to recharge the condenser 619 and raise the negative potential of the terminal 621 to the negative 80 volt value. During the closed circuit period of each impulse the described relaxation operation of the tube 607 and condenser 619 is resumed and this action continues after the dialing operation is completed and so long as the receiver at the calling substation is held off hook.

When the call is abandoned or terminated, gating of multiplexer pulses to the conductor 602 by the pulse input circuit 200 is interrupted in the manner described above. Accordingly, the condenser 619 is permitted to charge through the resistor 613 from the cathode resistor 611 so that the negative potential of the terminal 621 is decreased to a value such that the tube 606 fires. In firing, the tube 606 incidentally discharged the condenser 625 through the space current path thereof and the resistor 618. Thus a voltage of approximately 130 volts is developed across the resistor 618. This voltage spike is additively combined with the 140 volts across the charged condenser 617 to produce a voltage across the cathode resistor 611 of approximately 270 volts. Thus, the cathode of the tube 605 is driven positive relative to the anode of this tube and space current flow through the tube is interrupted and operating potentials are removed from the conductors 612 and 12*c*. As a consequence the tubes 620 and 643 in the circuits 203 and 204 are deionized, the tube 606 is deionized, and all gas filled tubes of the connector 12*b* are deionized. Following deionization of the identified tubes the finder 12*a* and the connector 12*b* are fully restored to normal.

While one embodiment of the present invention has been disclosed, it will be understood that various modifications may be made therein without departing from the true spirit and scope of the invention as defined in the appended claims.

What is claimed as new and desired to be secured by United States Letters Patent is:

1. In an automatic telephone system, a plurality of lines having individually assigned thereto different time positions in repetitive time position frames, electronic multplexing means for sampling signals produced on said lines in the time positions individually assigned to said lines, electronic distributing means for distributing signals to said lines derived from signal samples appearing in the time positions individually assigned to said lines, a plurality of line selecting and signal sample transmission links common to said lines and each directively controllable over any calling one of said lines selectively to route signal samples derived from the calling line through said distributing means to any called one of said lines in the time position assigned to the called line and to route signal samples derived from the called line through said distributing means to the calling line in the time position assigned to the calling line, said links being arranged in a predetermined order, means for initially supplying a control signal to the first one of said links, thereby to assign said first link to the use of a first calling line, and means for diverting said control signal to the next succeeding link when the one link is taken into use by a calling line, thereby to allot successive ones of said links to the use of successively initiated simultaneously calling lines in the order in which said links are arranged.

2. In an automatic telephone system, a plurality of lines having individually assigned thereto different time positions in repetitive time position frames, a plurality of time position responsive line selecting links common to said lines and arranged to be taken into use in a predetermined order, means including said links for concurrently setting up connections between different pairs of said lines, a control signal source, means continuously connecting said control signal source to the first link in said predetermined order, means included in each link and responsive to a control signal from said source for conditioning the link for seizure by a calling line, and means included in each link and responsive to seizure thereof by a calling line for diverting said control signal to the next link in said predetermined order, thereby to condition said next link for seizure by the next successively initiated simultaneously calling line.

3. In an automatic telephone system, a plurality of lines having individually assigned thereto different time positions in repetitive time position frames, a plurality of time position responsive line selecting links common to said lines and arranged to be taken into use in a predetermined order, means including said links for concurrently setting up connections between different pairs of said lines, means normally rendering each of said links inoperative to handle a call, means normally supplying an enabling control signal to one of said links to permit said one link to be taken into use by a first calling line, said control signal comprising a repetitively produced electrical control signal, and means in each of said links and responsive to seizure of the link by a calling line for diverting said control signal to the next link in said order, thereby to enable said next link to be taken into use by the next successively initiated simultaneously calling line.

4. In an automatic telephone system, a plurality of lines, a plurality of line selecting links common to said lines and arranged to be taken into use in a predetermined order, means including said links for concurrently setting up connections between different pairs of said lines, a control signal path connecting all of said links in series in said predetermined order, means individual to each link for normally blocking said series path to prevent the transmission of signals therethrough, means normally supplying a repetitively produced electrical control signal to the first link in said path to render said first link available to the use of the first calling line of the system, and means individual to each link and responsive to seizure of the link by a calling line for unblocking said series path and diverting said control signal over said path to the next link in said order, whereby said links are assigned to successively initiated simultaneously calling lines of the system in said predetermined order.

5. In an automatic telephone system, a plurality of lines, a plurality of line selecting links common to said lines and arranged to be taken into use in a predetermined order, means including said links for concurrently setting up connections between different pairs of said lines, a control signal path connecting all of said links in series in the order thereof, a plurality of normally closed allotter gate circuits included in said series path and individual to each of said links for normally blocking transmission of signals over said path, means individual to each of said links for holding the link inoperative to handle a call, a repetitively produced electrical control signal source, means normally supplying a control signal from said source to the first link in said series to render said one link available to the use of the first calling line of the system, and means individual to each link and responsive to seizure thereof by a calling line for opening the gate circuit associated therewith and diverting said control signal to the next link over said control signal path, whereby said links are assigned to successively initiated simultaneously calling lines of the system in the order in which said links are arranged to be taken into use.

6. In an automatic telephone system, a plurality of lines, a plurality of line selecting links common to said lines and arranged to be taken into use in a predetermined order, means including said links for concurrently setting up connections between different pairs of said lines, each of said links including a plurality of electronic circuits and a switching circuit adapted to supply an energizing potential to said electronic circuits for operatively associating the link with a calling one of said lines, means individual to each link for normally applying a disabling bias to the switching circuit thereof to prevent energization of said electronic circuits and operative association of the link with a calling line of the system, a control signal source, means normally supplying a control signal from said source to one link to overcome the disabling bias normally applied to the switching circuit thereof and thus permit said one link to handle a first calling line of the system, and means in each of said links responsive to operation of the switching circuit thereof for diverting said control signal to the next link in said order.

7. In an automatic telephone system, a plurality of lines, a plurality of line selecting links common to said lines and arranged to be taken into use in a predetermined order, means including said links for concurrently setting up connections between different pairs of said lines, a control signal path connecting all of said links in series in the order thereof, a normally closed gate circuit in each of said links and included in said control signal path, a normally inoperative switching circuit included in each of said links and effective when operative to associate the link with a calling one of said lines, a repetitively produced electrical control signal source, means normally supplying a control signal from said source to the first one of said links to render the switching circuit thereof operative to associate the link with a first calling line of the system, and means included in each of said links and responsive to seizure of the link by a calling line for opening the gate circuit thereof and diverting said control signal to the next link in said order, whereby said links are taken into use by successively initiated simultaneously calling lines in said predetermined order.

8. In an automatic telephone system, a plurality of lines, a plurality of line selecting links common to said lines and arranged to be taken into use in a predetermined order, means including said links for concurrently setting up connections between different pairs of said lines, a self-allotting circuit included in each link and having an input and an output terminal and a normally closed gate circuit bridging said terminals for enabling the link to be operatively associated with a calling one of said lines, means connecting the input and output terminals of said self-allotting circuits in series relation in the order in which said links are arranged to be taken into use, an alternating current source of enabling voltage connected to the input terminal of the first one of said links for enabling the first link to be seized by a first calling line of the system, and means included in each of said links for opening the gate circuit associated therewith in response to seizure of the link by a calling line, thereby to enable successive ones of said links by transmission of said enabling voltage over said series connection to handle successively initiated simultaneously calls.

9. In an automatic telephone system, a plurality of lines, a plurality of line selecting links common to said lines and arranged to be taken into use in a predetermined order, means including said links for concurrently setting up connections between different pairs of said lines, a self-allotting circuit included in each link and having an input and an output terminal and a normally closed gate circuit bridging said terminals for enabling the link to be operatively associated with a calling one of said lines, means connecting the input and output terminals of said self-allotting circuits in series relation in the order in which said links are arranged to be taken into use, an alternating current source of enabling voltage connected to the input terminal of the first one of said links for enabling the first link to be seized by the first calling line, means included in each of said links for opening the gate circuit associated therewith in response to seizure of the link by a calling line, thereby to enable successive ones of said links as the preceding link is taken into use by a calling line, and means included in each of said links for holding the link operatively associated with the calling line to which the link is connected independently of the condition of the self-allotting circuit thereof.

References Cited in the file of this patent

UNITED STATES PATENTS

| | | |
|---|---|---|
| 2,294,907 | Hovland | Sept. 8, 1942 |
| 2,513,426 | Lomax | July 4, 1950 |
| 2,649,505 | Ransom | Aug. 18, 1953 |
| 2,668,194 | Kessler | Feb. 2, 1954 |
| 2,747,021 | Chubb et al. | May 22, 1956 |

FOREIGN PATENTS

| | | |
|---|---|---|
| 632,375 | Great Britain | Nov. 28, 1949 |